United States Patent
Strong et al.

(10) Patent No.: US 7,411,921 B2
(45) Date of Patent: Aug. 12, 2008

(54) METHOD AND APPARATUS FOR INTEGRATING WIRELESS COMMUNICATION AND ASSET LOCATION

(75) Inventors: Jon Strong, Rittman, OH (US); Jay Werb, Newton, MA (US); Colin Lanzl, Nashua, NH (US)

(73) Assignee: RF Technologies, Inc., Brookfield, WI (US)

( * ) Notice: Subject to any disclaimer, the term of this patent is extended or adjusted under 35 U.S.C. 154(b) by 1182 days.

(21) Appl. No.: 10/036,710

(22) Filed: Dec. 21, 2001
(Under 37 CFR 1.47)

(65) Prior Publication Data
US 2003/0007473 A1    Jan. 9, 2003

Related U.S. Application Data

(63) Continuation of application No. 09/791,037, filed on Feb. 16, 2001, now abandoned.

(60) Provisional application No. 60/247,080, filed on Nov. 10, 2000, provisional application No. 60/239,593, filed on Oct. 11, 2000, provisional application No. 60/216,242, filed on Jul. 6, 2000, provisional application No. 60/191,030, filed on Mar. 21, 2000, provisional application No. 60/183,193, filed on Feb. 17, 2000, provisional application No. 60/181,848, filed on Feb. 11, 2000, provisional application No. 60/160,460, filed on Oct. 21, 1999.

(51) Int. Cl.
*H04Q 7/00* (2006.01)

(52) U.S. Cl. ................................ 370/328; 340/10.1
(58) Field of Classification Search ................. None
See application file for complete search history.

(56) References Cited

U.S. PATENT DOCUMENTS

| | | | | |
|---|---|---|---|---|
| 5,892,441 A * | 4/1999 | Woolley et al. | ........ | 340/539.26 |
| 5,929,779 A * | 7/1999 | MacLellan et al. | ......... | 340/10.2 |
| 5,959,568 A * | 9/1999 | Woolley | ...................... | 342/42 |
| 6,344,794 B1 * | 2/2002 | Ulrich et al. | ........... | 340/539.16 |
| 6,353,406 B1 * | 3/2002 | Lanzl et al. | ................. | 342/118 |
| 6,778,096 B1 * | 8/2004 | Ward et al. | ...................... | 713/1 |
| 6,825,763 B2 * | 11/2004 | Ulrich et al. | ............. | 340/539.1 |
| 2002/0171534 A1 * | 11/2002 | Ashwin | ...................... | 340/10.3 |

* cited by examiner

*Primary Examiner*—Phirin Sam
(74) *Attorney, Agent, or Firm*—Wolf, Greenfield & Sacks, P.C.

(57) ABSTRACT

A method and apparatus to identify tags in a wireless tag identification system. Operation of the wireless tag identification system may be controlled to minimize interference or otherwise improve interoperation with a wireless communication system, such as a wireless local area network (WLAN). For example, the timing and/or power of wireless signals produced by the wireless tag identification system can be controlled to provide sufficient space to the wireless communication system to operate properly. The systems may be tightly integrated, e.g., so that tags may be identified by responding to wireless communications traffic as opposed to special purpose tag search signals. The wireless communications traffic may be modified to enhance tag location resolution.

138 Claims, 14 Drawing Sheets

METHOD AND APPARATUS FOR INTEGRATING WIRELESS COMMUNICATION AND ASSET LOCATION

RELATED APPLICATIONS

The present application is a continuation and claims priority of U.S. patent application Ser. No. 09/791,037 to Lanzl et al., filed on Feb. 16, 2001, which is a continuation-in-part of U.S. non-provisional application Ser. Nos. 09/517,606, filed Mar. 2, 2000, now U.S. Pat. No. 6,812,824, and 09/694,767, filed Oct. 23, 2000, now abandoned, which claims the benefit under 35 U.S.C. §119(e) of U.S. provisional applications 60/160,460, filed Oct. 21, 1999, and 60/181,848, filed Feb. 11, 2000, which are all hereby incorporated by reference in their entirety. U.S. application Ser. No. 09/781,037, and thus this application, also claims the benefit of U.S. provisional application Nos. 60/183,193, filed Feb. 17, 2000, 60/191,030, filed Mar. 21, 2000, 60/216,242, filed Jul. 6, 2000, 60/239,593, filed Oct. 11, 2000, and 60/247,080, filed Nov. 10, 2000, which are all hereby incorporated by reference in their entirety.

FIELD OF THE INVENTION

This invention relates to location identification of mobile and stationary assets and communicating using a wireless network.

BACKGROUND OF THE INVENTION

Wireless communication has become increasingly popular, and the adoption of Wireless Local Area Network (WLAN) technology seems likely to follow that of conventional Local Area Network (LAN) technology in the 1980s. LANs were typically installed to support the sharing of centralized resources, such as printers, backup equipment, and central disks. Over time, network services were extended to include email, workgroup software, and the Internet. By 1995, it became almost unimaginable to have a modern office without a LAN. A WLAN is a natural extension of conventional LAN technology, and is usually justified and installed based on a single application, such as support for a relatively small population of mobile devices, or support for cordless telephony. Once the infrastructure is in place, coverage and additional devices may be added to the WLAN incrementally.

Monitoring and tracking the location of assets, such as personnel, inventory, vehicles, and so on, in a facility can be important, e.g., to ensure the safety, proper allocation, or appropriate use of the assets. One class of several different solutions that has been used to track assets is a Local Positioning System (LPS). One particular type of communicate over radio frequency bands with tags attached to assets that are to be tracked by the system. The tags and the antenna transceivers communicate using radio frequency communication bands, and the information gathered from the tags is used by the system to generate useful data about the tagged assets, such as the location of the assets. Determining a location of the tags as used herein may provide a general area in which a tag is located (e.g., a room or other zone indication), a precise position of the tag (e.g., 2 or 3 dimensional coordinates of the tag relative to a reference point), a direction in which the tag is located relative to a reference direction or point, or any other suitable indication of the tag location.

Equipment for and installation of a dedicated wireless tag identification system infrastructure can in some cases be expensive, and when the total number of assets to be tracked is small, the cost per asset may be prohibitively high. In addition, a facility wishing to add an asset tracking resource to its operations may already have one or more wireless communication systems installed and operating within the facility. Thus, adding an additional communication system to the facility may be cumbersome, interfere with other communications, and/or require unwanted additional expense.

SUMMARY OF THE INVENTION

In an illustrative embodiment in accordance with one aspect of the invention, a wireless communication system and a wireless tag identification system are configured to operate in a common environment while minimizing disruption of both wireless communication system and asset location activities. The wireless communication system may be any type of communications network that carries communications information, such as audio, video or data information, e.g., a WLAN, mobile telephone network, etc.

In one embodiment in accordance with one aspect of the invention, a method for determining a location for assets includes providing a plurality of assets, and producing a wireless communication signal involving a mobile device. The wireless communication signal represents communications audio, video or data information. A frequency shifting transponder is used in conjunction with the wireless communication signal to locate at least one of the assets.

In another embodiment, a method for controlling operations of a wireless communication system and a wireless tag identification system having at least partially overlapping coverage areas includes providing a wireless communication system having at least two wireless communication devices adapted to communicate by wireless signals, and providing a wireless tag identification system adapted to communicate by wireless signals with at least one tag associated with an asset. The wireless signals produced by the wireless tag identification system are controlled to minimize interference of the wireless signals with wireless communication of the wireless communication system.

In another embodiment, a method for identifying tags includes providing at least one tag adapted to transmit a wireless signal, and providing a wireless tag identification system adapted to receive a wireless signal from the at least one tag and determine a location for the tag. A first technique is used to determine the likelihood that the tag is within acceptable communication range, and a second technique is used to collect data from the tag if the tag is determined likely to be within an acceptable communication range.

In another embodiment, a method for identifying assets includes providing at least one tag adapted to transmit a wireless signal, and providing a wireless tag identification system adapted to receive a wireless signal from the at least one tag and determine a location for the tag. A wireless signal is received from the tag including a tag datagram in which an error checking code portion of the tag datagram is transmitted at the start of the tag datagram.

In another embodiment, a method for identifying assets includes providing a plurality of tags adapted to transmit wireless signals including different length header portions, and providing a wireless tag identification system adapted to receive a wireless signal from the tags and determine a location for the tags.

In another embodiment, a method for communicating with communication devices in a wireless communication system and tags associated with assets in a wireless tag identification system includes sending and receiving wireless signals to and from communication devices in the wireless communication system, and receiving a second wireless signal sent from a tag in response to a first wireless signal. The first wireless signal is sent from at least one communication device in the wireless communication system, and the first wireless signal is not addressed to the tag. The second wireless signal is used to estimate the location of an asset.

In one illustrative embodiment in accordance with one aspect of the invention, a system for determining a location for assets includes means for producing a wireless communication signal in a wireless communication system including a mobile communication device, the wireless communication signal representing communications audio, video or data information, and asset locating means, including at least one frequency shifting transponder, for using the wireless communication signal to locate at least one of the assets.

In another embodiment, a wireless tag identification system includes a plurality of tags each associated with an asset, and at least one tag sensor adapted to communicate by wireless signals with at least one tag. The at least one tag sensor has a coverage area within which the tag sensor can communicate with tags. Means for controlling wireless signals produced by the at least one tag sensor minimize interference of the wireless signals with wireless communication of a wireless communication system taking place within the coverage area of the at least one tag sensor.

In another embodiment, a wireless tag identification system for identifying tags includes at least one tag adapted to produce a wireless signal, and at least one tag sensor that receives a wireless signal from the at least one tag. Also included are means for determining an identity of the tag based on the wireless signal received from the tag, and means for controlling how wireless signals are generated by the tag sensor. The means for controlling uses a first technique to determine the likelihood that the tag is within acceptable communication range, and uses a second technique to collect data from the tag if the tag is determined likely to be within an acceptable communication range.

In another embodiment, a system for identifying assets includes at least one tag adapted to produce a wireless signal including a tag datagram in which an error checking code portion of the tag datagram is transmitted at the start of the tag datagram. Also included are at least one tag sensor adapted to receive a wireless signal from the at least one tag, and means for determining a location for the tag based on the received wireless signal.

In another embodiment, a system for identifying assets includes a plurality of tags adapted to produce wireless signals including different length header portions, and at least one tag sensor adapted to receive a wireless signal from the at least one tag. Also includes are means for determining a location for the tag based on the received wireless signal.

In another embodiment, an integrated system for communicating with communication devices in a wireless communication system and tags associated with assets in a wireless tag identification system includes means for sending and receiving wireless signals to and from communication devices in the wireless communication system, and means for receiving a second wireless signal sent from a tag in response to a first wireless signal, said first wireless signal being sent from at least one communication device in the wireless communication system, and said first wireless signal not being addressed to the tag. Also included are means for using the second wireless signal to estimate the location of an asset.

The following description and the appended drawings set forth in detail certain explicatory embodiments of the invention. However, these embodiments are indicative of but a few of the numerous ways in which various aspects of the invention may be employed. Other objects, advantages, and novel features of the invention will become evident from the following detailed description of the invention when considered in conjunction with the drawings.

BRIEF DESCRIPTION OF THE DRAWINGS

Illustrative embodiments of the invention are described with reference to the following drawings, in which reference numbers indicate similar elements, and wherein.

DETAILED DESCRIPTION

Figure 1:
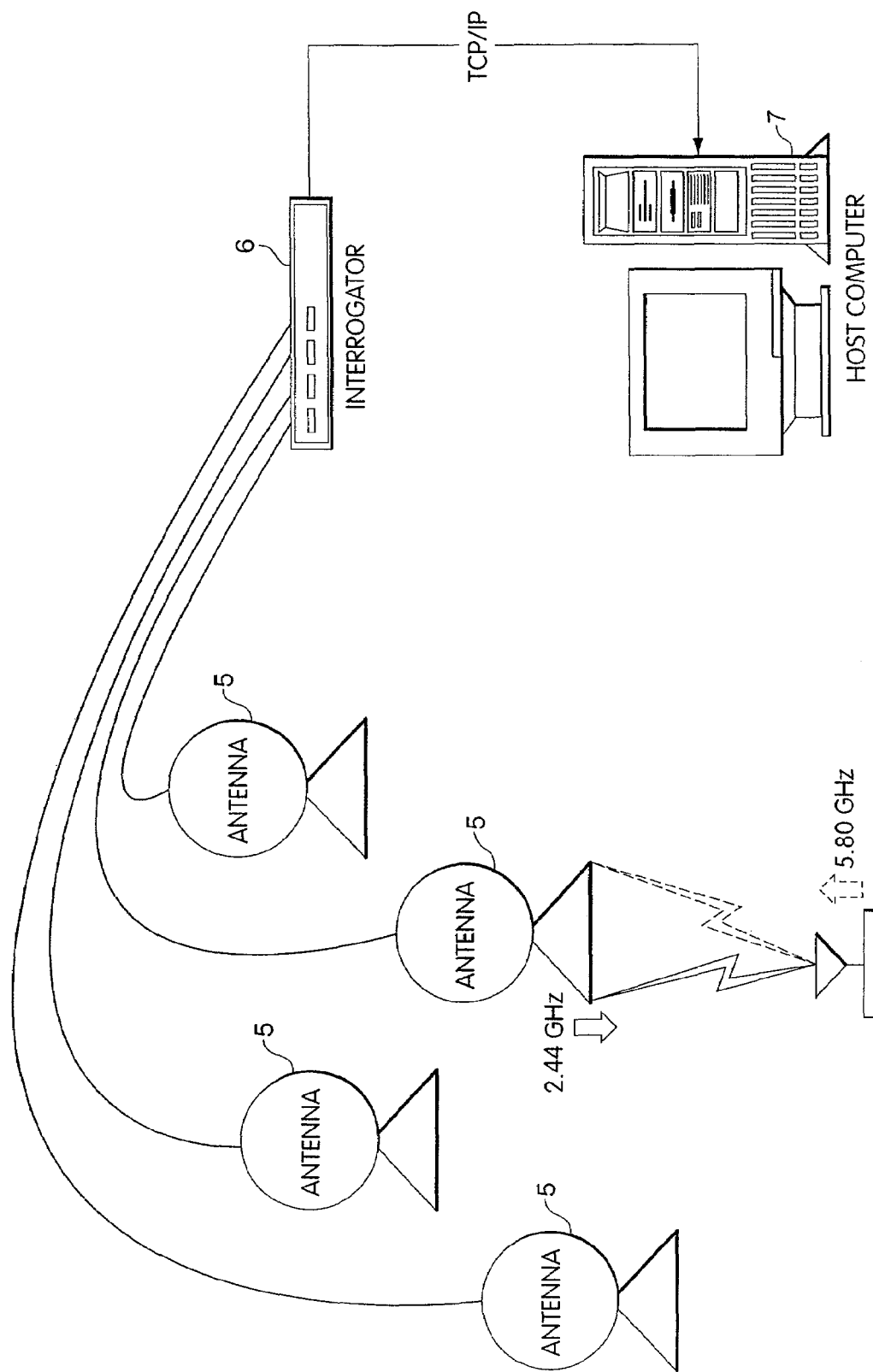
FIG. 1 is a schematic block diagram of an illustrative wireless tag identification system in one embodiment in accordance with an aspect of the invention.

As discussed briefly above, a Local Positioning System (LPS) is one type of wireless tag identification system that is designed to track the locations of tags as they move through a facility. In some circumstances, users may wish to employ an LPS alongside a wireless communication system, such as an 802.11-based WLAN. In such cases, it may be necessary to coordinate LPS and WLAN traffic in such a way that tags may be continuously tracked without interfering with WLAN communication. Thus, it may be desirable to design a system that would allow LPS and WLAN traffic to coexist without interference, or minimal interference. In addition, users of wireless communication systems may prefer not to install multiple infrastructures. Thus, in order to coordinate LPS and WLAN traffic while decreasing the need to install an additional infrastructure, it may be desirable to design a system with integrated LPS and WLAN capabilities.

Today, LPSs and WLANs are promoted, justified, and installed separately. Sometimes a WLAN is installed first, with an LPS added later. Other times the order is reversed. Thus, in many cases, both LPS and WLAN capabilities are of interest to end users. Since an LPS and WLAN may be installed in the same physical space, or in partially overlapping spaces, there may be an advantage to providing a WLAN and LPS as a single, properly functioning package. Products that are integrated in this fashion may have a distinct commercial advantage over stand-alone products from at least three important perspectives:

1. End users who require both LPS and WLAN solutions will tend to favor solutions with a clear upgrade path. Thus, emerging LPS products that do not harmoniously share the radio channel with WLANs may be at a commercial disadvantage, particularly in sites where such WLANs are already in place.

2. With the emergence of the 802.11 WLAN standard, WLANs are becoming commodities. The hardware is increasingly being promoted with an emphasis on system-level features. Wireless systems that seamlessly support LPS with the same infrastructure may have an important competitive advantage.

3. A smooth upgrade path from WLAN to LPS and vice versa creates a follow-on sales opportunity once the initial infrastructure is in place.

Below, the inventors describe a variety of approaches to achieve interoperability and/or integration between a WLAN and LPS. Although a WLAN and LPS are used in the illustrative embodiments, the invention is not limited to these system as the various aspects of the invention may be used in other environments. Thus, although illustrative embodiments are described with reference to the PinPoint LPS or derivative designs, the various aspects of the invention may be used with other wireless tag identification systems, such as those that use radio frequency signals, Global Positioning System (GPS), E-911, Doppler shift, infrared signals, ultrasonic signals, or any other signal or technique, or combination of signals and techniques. For example, the techniques described below, especially with regard to duty cycling the interrogator and the use of a CCA, may be advantageously applied in any Radio Frequency Identification (RFID) interrogator that may share the radio channel with a wireless communication system. (LPS tags are usually considered a high-performance type of RFID tag.) These same techniques may be applied to other types of RFID and other wireless tag identification systems, and no limitation is intended. Similarly, several of these techniques may also be advantageously applied to prevent nearby interrogators—of the same type and of different types—from interfering with each other.

A wireless communication system operating in accordance with the widely used 802.11 WLAN protocol is used herein as a primary example of a WLAN. An understanding of the 802.11 protocol (Direct Sequence Spread Spectrum, or DSSS), which is publicly available from IEEE (Institute of Electrical and Electronics Engineers), is assumed. Thus, a detailed description of the operation and components of a WLAN is not provided herein. As with the LPS, various aspects of the invention are not limited to use with a WLAN, much less an 802.11 compliant WLAN. Instead, any suitable wireless communication system may be used, such as those that use radio frequency signals, infrared or other electromagnetic signals, ultrasonic signals, or any other suitable signal type or combination of signal types. The wireless communication system may include all mobile communication devices, all fixed communication devices, or any suitable combination of the two, and may use any suitable protocol or other communication format. A typical wireless communication system may have fixed communication devices, such as access points in a WLAN, that communicate with mobile communication devices, such as mobile telephones, personal digital assistants, etc.

In the description below, specifications of both a 802.11 LAN and one type of LPS are discussed to identify some of the considerations for coordinating LPS and WLAN traffic, and methods for coordinating channel usage between an 802.11 WLAN and an LPS are described, e.g., a system with integrated WLAN and LPS capabilities in a single infrastructure. Although the illustrative embodiments described below focus mainly on the tight integration of LPS with 802.11 WLANs, the same or similar techniques, systems and methods described herein may be used with other wireless communication system technology standards, such as DECT and Bluetooth. Thus, the same general concepts apply to other products, and the techniques are not intended to be restricted to 802.11 technology. Quite to the contrary: the basic scheme may be flexible enough to interoperate with all WLANs or other wireless communication systems of concern to end users, and only a few of the techniques described herein are specific to 802.11.

Wireless Tag Identification System Infrastructure

As shown in FIG. 1, an LPS, such as PinPoint's LPS, typically includes a set of interrogator antenna modules 5 arranged in an environment that can communicate over radio frequency bands with tags 2 attached to assets (not shown) that are to be tracked by the system. The tags 2 and the antenna modules 5 communicate using radio frequency communication bands, and the information gathered from the tags 2 is provided to an interrogator 6 and a host computer 7 and used to generate useful data about the tagged assets, such as the location of the assets. The term tag sensor is used herein to refer to any device that is capable of detecting the presence of a tag, and may include an antenna module, interrogator, tag reader or any other suitable device. Details regarding the operation of such an LPS have been previously disclosed, for example, in the applications incorporated above. Thus, a detailed description of the system operation and components not directly related to aspects of the invention is not provided herein. As discussed below, an LPS may be installed in an environment shared by one or more WLANs, and the LPS may be configured to incorporate many of the various aspects of the invention.

Figure 2:
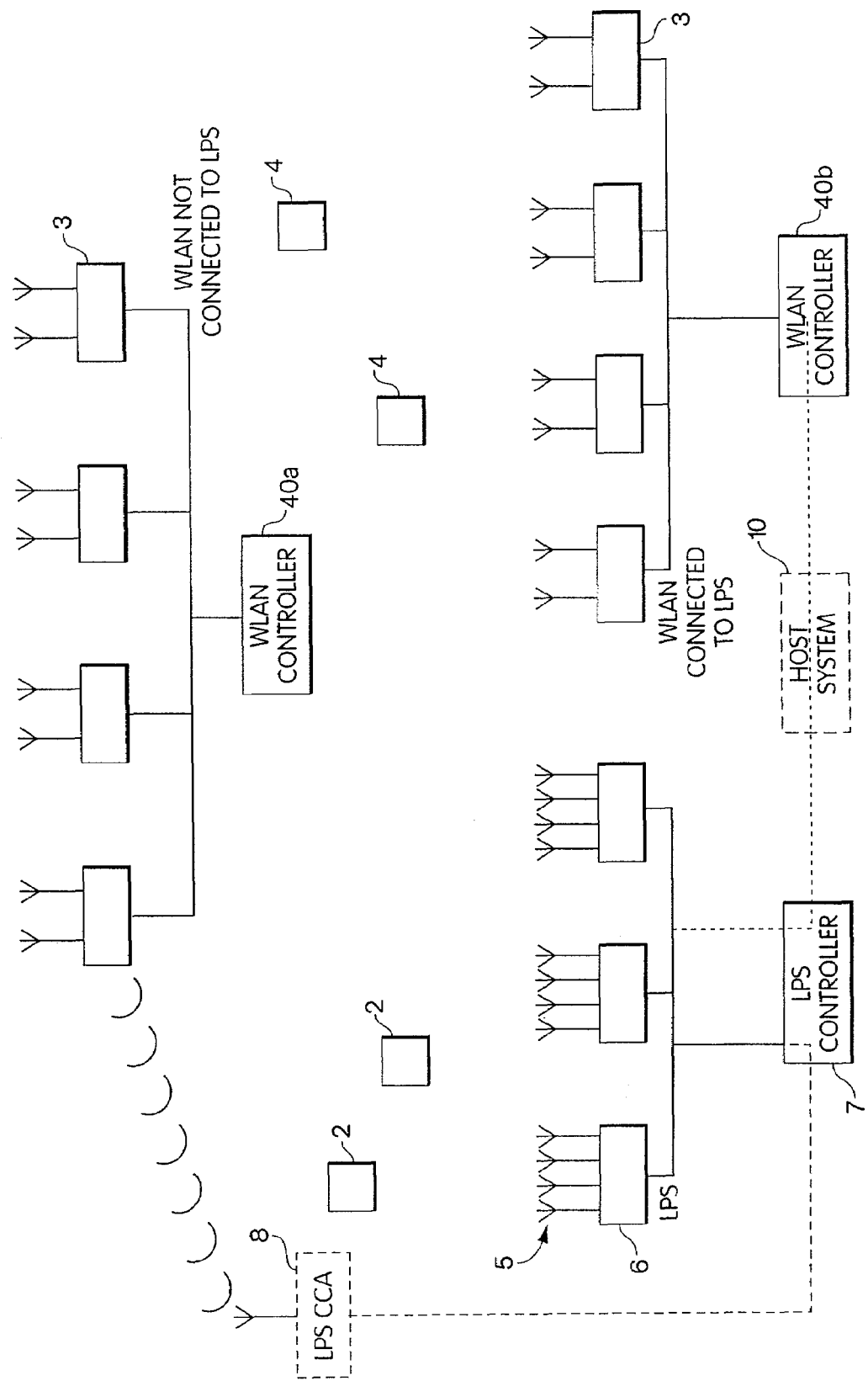
FIG. 2 is a schematic block diagram of an illustrative embodiment including a wireless tag identification system and two wireless communication systems.

In one illustrative embodiment, one or more WLANs and an LPS may be installed side by side, each with its own infrastructure, as shown in FIG. 2. In this illustrative embodiment, an LPS is operated in an environment in which the LPS coverage area, i.e., the area within which the LPS may communicate with tags 2 and determine tag location, overlaps at least partially with a coverage area of the two WLANs controlled by WLAN controllers 40*a* and 40*b*, respectively. Although in this example, two WLANs and a single LPS are shown, any suitable number of WLANs and/or LPSs (or other wireless communication systems and wireless tag identification systems) may be used. In addition, the LPS is shown as including three interrogators 6 that each communicate with four antenna modules 5, but it should be understood that the LPS may include any suitable number of interrogators 6 and/or antenna modules 5 and any suitable number of antenna modules 5 may communicate with each interrogator 6. In addition, other wireless tag identification systems may not use the interrogator/antenna module structure of the LPS and/or may use mobile tag sensors (not shown) to communicate with tags. In short, any suitable arrangement for a wireless tag identification system may be used as the invention is not limited in this regard.

The same is true for the WLANs. In this illustrative embodiment, each WLAN includes three access points 3 that communicate with a WLAN controller 40, but any number of access points 3, controllers 40 and any other components may be used in the wireless communication system. As with the LPS controller 7, the WLAN controller 40 may include any suitable components to perform desired functions, such as one or a network of general-purpose computers and/or special purpose devices, any suitable software modules, hardware, firmware, or other components necessary to perform desired input/output, analysis, reporting, communication or other functions. For example, 802.11 access points and PinPoint LPS interrogators are commonly implemented as devices that plug directly into an Ethernet LAN, and devices on the LAN may access these devices directly. Controller functions may be implemented as software services running on servers on the LAN and/or may run on designated access points or interrogators on the LAN. The access points 3 may operate using the 802.11 standard or any other suitable protocol for communicating wirelessly with devices 4 in a network. In this illustrative embodiment, the access points 3 may include a direct sequence 802.11 standard transmitter/receiver that transmits and receives communication signals with respect to communication devices 4 in the WLAN.

Under certain conditions, an LPS operating in the 2.4 GHz band may interfere with the operation of WLAN products also operating in the 2.4 GHz band. Because both is WLANs and LPSs operating in the 2.4 GHz band are being installed more and more frequently, it may be desirable to lessen the possibility and/or the effect of interference between LPSs and WLANs. Properly installed systems will usually not have a cross-interference problem. For example, in many cases cross-interference can be essentially eliminated by placing LPS and WLAN antennas in different positions and/or orientations (e.g., LPS antenna modules 5 may emit radiation using directional antennas that are directed away from access points 3), at compatible power levels, and at different center frequencies. However, despite these techniques, under certain conditions, LPS interrogators 6 operating in the 2.4 GHz ISM band may degrade the performance of WLANs also operating in the 2.4 GHz band, or vice versa.

In accordance with one aspect of the invention, the timing at which the wireless tag identification system is permitted to transmit wireless signals, e.g., to communicate with tags 2 and determine their location, may be adjusted to minimize interference with wireless communication of the wireless communication system, such as a WLAN.

Duty Cycle Control

One approach for limiting interference between an LPS and the WLAN is to adjust the duty cycle at which one or more antennas 5 and/or interrogators 6 in the LPS operate. The term duty cycle as used herein refers to any suitable timing control of when any portion of the wireless tag identification system is permitted to transmit wireless signals. Thus, a duty cycle may be a regular, periodic timing at which the wireless tag identification system is permitted to transmit, or may be an irregular, random or otherwise non-periodic timing. For example, duty cycle control software, hardware and/or firmware may be implemented in the LPS controller 7 and/or the interrogator 6 and/or any other suitable processing apparatus that communicates within or with the LPS. For example, an interrogator 6 might be "on", e.g., permitted to transmit wireless signals, for 250 milliseconds every second, and "off" for other portions of the time. One implementation of duty cycle control may be based on three parameters: (a) Fixed On duration (for example 250 milliseconds); (b) Fixed Off duration (for example 500 milliseconds); and (c) Randomized Off duration (for example 500 milliseconds). In this example, the interrogator 6 may turn on for a period of 250 milliseconds, and then turn off for a period of 500 milliseconds. Before turning on again, the interrogator 6 may generate a random number from 0 to 500, and wait the random number of milliseconds before turning on again. The result may be an average duty cycle of 0.25 seconds on and 0.75 seconds off. The randomized component may prevent the interrogator cycle from occurring in synchronization with other periodic processes, e.g., such as those occurring in the WLAN wireless communications. (In the case of the PinPoint LPS, tags 2 themselves transmit on a periodic schedule. Other processes, such as WLAN "heartbeats," might be on similar periodic schedules.)

For LPSs operating at a relatively high power, e.g., above 100 milliwatts, such duty cycle control may enable the system to operate legally, if regulations allow emitted power to be averaged. For example, during an On portion of the duty cycle, the LPS may emit a power level that is too high to be in accordance with regulations if the power level was sustained. However, if the on portion of the duty cycle is sufficiently short compared to the Off portion of the duty cycle and the regulations permit power averaging, the average power emitted by the LPS over the on and off periods may be within an acceptable range. Alternately, the LPS may adjust the power of signals emitted by one or more interrogators and/or antennas to minimize interference with the WLAN. Thus, power control may be performed dynamically, e.g., in response to WLAN activity, and/or on an antenna or interrogator basis.

These and other operational parameters of the WLAN and/or the LPS may be set to achieve the desired performance tradeoff of the WLAN vs. LPS. For example, an installer of the WLAN and/or LPS might refer to a manual to determine optimal parameters for WLAN/LPS interoperation. Alternately, for example, the configuration software for the LPS might allow a user to specify a WLAN product with which the LPS is to interoperate and the level of interferece that is acceptable; based on this specification, the LPS configuration software may set the detailed parameters using a lookup table or other technique. For example, in addition to setting duty cycle or power control and other parameters, in cases where an interrogator 6 uses a WLAN for communication back to the LPS controller 7, WLAN data transmissions for the interrogator 6 may take place during the interrogator Off periods.

Another potentially important optimization that may be used is to synchronize the duty cycle or other operation timing among nearby interrogators 6 and/or antennas 5. For example, if each interrogator 6 has an independent duty cycle, an Off time from one interrogator may occur during the On time of another interrogator 6. Thus, the periods of non-interference may be accordingly reduced for WLAN access points 3 and devices 4 in range of both interrogators 6. Synchronizing the duty cycles among the nearby interrogators 6 may mitigate this effect. In cases like the PinPoint LPS, where the interrogators 6 are on a local area network, one interrogator (or the host, i.e., the LPS controller 7) may be set up as the Master with the other interrogators 6 as Slaves when it is time to turn on, the Master may send a Turn On command including duration to the Slave interrogators 6. Due to packet transmission time over the LPS network and operating system delays, it may take a few milliseconds for this command to actually be received at the interrogators 6; therefore, for best effectiveness, the On duration may be a significant multiple (say 10 times or more) of such latency time. To some extent, for critical applications, such latency may be calibrated at installation and adjustments may be made accordingly, e.g., the turn on command may be sent in advance of a desired turn on time for the interrogators to account for transmission delay.

Alternately, interrogator synchronization may be accomplished by sending a schedule from the Master to the Slaves. For example, the Master may send a schedule for the next ten On/Off cycles to the Slaves. If the network is known to have approximately a seven-millisecond delay between a particular Master and a particular Slave, the Master can send the message seven milliseconds early. Alternatively, if the network has a reliable time synchronization facility, the duty cycle timing may be based on the system clock, not the time of receipt. The On duration for the interrogators 6 and/or antennas 5 may vary according to the response from tags 2 in the coverage area for the interrogator/antenna. This notion is especially useful for LPSs with passive (i.e., no battery) modulated backscatter tags. If there are no tags in range, this fact may be apparent from the lack of modulated backscatter energy received by the interrogator 6 or antenna 5. (Even in the event of two tags operating simultaneously, such energy may be present.) Thus, the On duration may be set to the minimum required to see a single tag. Once a single tag is seen, the interrogator or antenna may be left on for as long as it takes to see all tags with the desired reliability.

An LPS may perform two basic functions: detecting newly arriving tags, and verifying that tags are still in range after they have been previously detected. Some optimizations in accordance with one or more aspects of the invention described below, may be used to lock onto new tags efficiently. In the case of PinPoint LPS, if the interrogator has previously seen a tag, it may forecast the tag's transmission time with reasonable accuracy. Forecasting may be possible if the randomized Off duration for the tag is based on a formula that incorporates the tag's serial number or some other known value. Since the interrogator, LPS controller or other portions of the wireless tag identification system may know the tag's serial number, once it has received a transmission from the tag, the tag's serial number can be used to forecast the tag's next transmission time. A randomization algorithm that may be used to control tag transmission timing is described in a subsequent section.

At the time of a forecasted tag transmission, one of the following things may happen: (1) The tag is read; (2) No in-band RF energy is received; (3) In-band RF energy is received at the expected time, but is interpreted as a corrupted datagram or other information indicating that at least one tag was transmitting at the expected time; (4) The interrogator's duty cycle was Off. Case 1 is unambiguous—the tag is determined to be present. Case 2 strongly suggests that the tag has moved out of range or has been obstructed. Case 3 is ambiguous, but suggests that the tag is probably still present. Case 4 provides no useful information. In Case 4, and as required in Case 3, software in the LPS controller 7 or other host computer may modify the duty cycle of an interrogator, antenna or other portion of the wireless tag identification system to look for a particular tag that has not been seen for a long time. For example, suppose the presence of every tag needs to be positively confirmed once per minute. Also, suppose that one would statistically expect 99.9% of tags to be seen once per minute. Therefore, if a particular tag has not been seen for a minute, the duty cycle or other operation timing can be adjusted to be On when that "missing" tag is expected to transmit. In this simple example, it will only be necessary to adjust the duty cycle once per minute for just 0.1% of the tags.

As mentioned above, the duty cycle or other operation timing may be set to vary by antenna 5. Certain areas, such as portals, hallways, doorways, etc., may be able to tolerate higher WLAN interference in exchange for higher LPS system performance. In one embodiment, each antenna may have a user-settable priority level, such as 1=High (e.g., for a portal); 2=Medium (e.g., for a loading dock area); 3=Low (e.g., for a permanent or semi-permanent storage area); 4=Very Low (e.g., for a high WLAN traffic area in which minimum interference is desired). Also, the duty cycle or other operation timing may be adjusted based on a time of day, day of week, etc. For example, during certain times of day, such as after hours in an office, WLAN activity may decrease, and thus users may be able to tolerate higher WLAN interference in exchange for higher LPS system performance. (After normal work hours in an office, there typically are few individuals in the office and there is a low level of WLAN activity. Setting a higher duty cycle, e.g., that allows a longer or higher percentage time for LPS wireless transmission, during those hours may allow the LPS to more readily detect unauthorized movement in the office, such as equipment theft.) The Master (described earlier) may include a priority level in its On commands. For antennas with a Low Priority Level, techniques may be used to minimize interference with WLAN activity, e.g., power levels for the antennas may be attenuated and/or directional antennas may be employed to limit the extent of RF emissions. Power levels may be attenuated on a per-antenna basis, that is, each antenna may have a different attenuation setting, e.g., depending on the proximity of the antenna to a WLAN traffic center (an area in which relatively higher levels of wireless communications take place). Adjustment to the duty cycle or other operation timing may be made automatically by the LPS controller 7 or other portion of the wireless tag identification system based on detected WLAN traffic in an area near one or more antennas. Detected WLAN traffic levels may be stored and used to develop a WLAN activity history that is then used to determine optimized wireless tag identification system operating parameters, such as duty cycle control, antenna power levels, etc.

In another illustrative embodiment, a variable duty cycle for the LPS wireless operations such as that described above may be combined with special embedded tag software to extend tag battery life. For example, on a relatively frequent basis, such as every two seconds, a tag may be programmed to wake up in two stages. During the first stage, the tag may turn on its receiver circuitry and monitor the received wireless signal strength at 2.4 GHz. If the tag detects a received signal level above a fixed threshold, and/or if variations in the received signal power resemble the pattern typically emitted by an LPS interrogator in search mode, the tag may turn on its transmitter after a short delay. Such delay may vary with the details of interrogator and tag operation. If no received signal is detected, the tag transmitter is not enabled. Since the tag uses much less power in receive mode, this approach may save battery power. However, the tag may not be completely accurate in determining whether an antenna is searching for a tag, as other 2.4 GHz emitters might be mistaken for an interrogator signal, and/or the interrogator/antenna may be too far away to trigger the threshold. Therefore, to ensure the tag is seen occasionally, the tag may transmit periodically whether or not incoming 2.4 GHz energy is detected. Similarly, a tag may be programmed to decrease its own rate if it sees incoming energy for a consecutive number of transmissions, or if an acknowledge (ACK) command is sent to the tag (e.g., via amplitude modulation) in response to its transmission.

The aforementioned techniques as with other aspects of the invention described herein, including varying duty cycles and power levels, may be advantageously applied in any suitable combination or alone. The wireless tag identification system may use a graphical user interface (GUI) to allow a user to set/select multiple operational parameters for the system. For example, an installer might refer to a manual to look up optimal parameters for interoperation with various WLAN products. The installer may then provide values for these parameters using the GUI. In another illustrative embodiment, the wireless tag identification system configuration software might allow a user to specify a WLAN product with which the wireless tag identification system is to operate, and the level of interference that is acceptable. Based on this selection, the system may set the detailed parameters from a lookup table or other information source. The wireless tag identification system may also be made "intelligent" so that it can use information, such as detected WLAN traffic near one or more antennas, e.g., using a CCA-type function described below, and adjust operating parameters of the system, such as a duty cycle for one or more tag sensors, to optimize tag location performance while minimizing interference with the WLA wireless communications. For example, when the wireless tag identification system is initially set up, an antenna may be believed to be located in a high WLAN traffic area and may be given a relatively low priority level. However, over time, the wireless tag identification system may determine that WLAN activity is not high enough in the vicinity of the antenna (at least at certain times of the day or week) to justify the low priority. In response, the priority level of the antenna may be increased, along with the percentage time that the antenna is permitted to transmit wireless signals.

Randomization Algorithm for Tags

The algorithm used to control a sleep time for a tag may take several considerations into account. For example, the algorithm may prevent pairs of tags from re-colliding repeatedly, and enable the interrogator or associated software to forecast tag transmission times. The algorithm may make optimal use of the limited capabilities of inexpensive microprocessors suitable for use in a tag, particularly with regard to power management, code space, and memory space.

In one illustrative embodiment in accordance with an aspect of the invention, a tag sleep algorithm endeavors to make optimal use of capabilities available in the PIC family of 8-bit microprocessors available from Microchip. PIC processors are illustrative of features available in inexpensive processors, and firmware running on PIC processors may also be implemented in custom devices (such as an ASIC) for further cost-reduction. PIC processors support two main timing techniques. A programmer may place the processor in a timed loop, with a resulting accuracy defined by the processor's crystal oscillator. While fairly high in precision, this approach also uses relatively high power. For lower accuracy at lower power, the PIC provides a watchdog timer based on an RC circuit, which allows the programmer to place the processor in a low-power state for a prescribed period of time. When the processor is programmed, the user may select one of the following fixed values for the watchdog timer: 18, 36, 72, 144, 288, 576, 1152, or 2304 milliseconds. The tag's low-power sleep cycle may be a multiple of this pre-selected value.

Suppose a sleep time is desired that varies pseudorandomly in the range of 5±0.5 seconds. If a watchdog timer period of 72 milliseconds is selected, this creates approximately 5000/72=69 slots over a five second period. A sleep time in the range of 5±0.5 seconds may be achieved by randomly selecting a set of watchdog intervals in the range of 63 to 76, as shown in the following pseudocode:

```
Set watchdog timer at 72 milliseconds;
While (true) {
    Select a pseudorandom Number from 63 to 76;
    For i = 1 to Number {sleep for 72 milliseconds};
    Transmit tag datagram;}
```

This algorithm provides better than expected performance due to small hardware differences between tags. In some cases, the watchdog timer may be accurate only within a range of about 30%. In practice, this degree of variation has not been observed, but significant differences from one component to another and at different temperatures has been observed. Despite the variation from one device to another, a given microprocessor may be quite consistent at a given temperature, with the watchdog timer varying by only a few microseconds from one tag transmission to the next. Thus, the watchdog timer does provide consistent signal timing that may be forecasted by an interrogator based on knowledge of the randomization algorithm.

For more predictable performance, in another illustrative embodiment, the watchdog timer may be calibrated. Calibration may be accomplished in firmware in the tag by running the watchdog timer at the same time as the tag microprocessor and using the microprocessor to calibrate the actual characteristics of the watchdog timer. This calibration process may be repeated periodically to account for factors that may cause the watchdog timer characteristics to drift, such as changes in ambient temperature.

The method used to select a pseudorandom number may involve storing a lookup table in the microprocessor's memory when the tag is programmed. For example, a sequence of 32 4-bit values may be placed in the tag microprocessor's memory. These values may be used by the tag microprocessor to select a sequence of 32 pseudorandom values. Expanding on the example above:

```
Set watchdog timer at 72 milliseconds;
index = 0;
While (true) {
    //Select a pseudorandom number from 0 to 13.
    Repeat index = ((index + 1) mod 32) until
    LookupTable[index] <= 13;
    //Wait for a pseudorandom period of 63 to 76 watchdog timer
    intervals
    For i = 1 to (63 + LookupTable[index]) {sleep for
    72 milliseconds};
    Transmit tag datagram;}
```

In the example above, the value of index may be transmitted with the tag datagram. Similarly, if the watchdog timer is calibrated this information may also be included in the tag datagram. Such information may improve the speed with which an interrogator or associated software may synchronize with the tag's pseudorandom transmission pattern. Even without such data, the interrogator or host software may synchronize with the tag's transmission pattern (or otherwise forecast the tag's transmission times) with only a copy of the tag's lookup table and the tag parameters that drive the tag's use of the lookup table.

As one example, the lookup table may be generated by first choosing 512 random sequences of, for example, 32 4-bit values. Next, the sequences may be split into 256 "low" sequences and 256 "high" sequences. The sequence used by each tag may be a combination of the low and high sequences based on the tag's unique ID. The low sequence may be selected by using the tag ID's low order byte. The high sequence may be selected by the high-order byte of the low-order word. For example, if $L[j]$ is the $j^{th}$ element of the low-order sequence, and $H[k]$ is the $k^{th}$ element of the high-order sequence, they may be combined into a resulting sequence R as follows: $R[j]=(L[j]+H[k])$ modulo 16. Software associated with the interrogator or other portion of the wireless tag identification system may thus derive the tag's lookup table based on the 512 base sequences combined with the low-order word of the tag's ID.

To generate the set of 512 sequences, an algorithm may be used generate 512 random sequences. For improved performance, a software program may test all possible pairs to reject pairs of sequences that are similar. For example, to test a pair of sequences, the two sequences may be aligned and tested to ensure that they are not largely identical. A pair of sequences may be rejected if, for example, the test software finds a run of 8 consecutive identical values. The test of a pair of sequences may be complete when they have been rotated through all possible relative positions. When the algorithm finds an unacceptable pair of sequences, it may discard one or both of the sequences in the offending pair, replace it with a newly generated random sequence, and try again. The result of such a process is a set of sequences with better than random behavior relative to one another.

Optimizing the Tag Search Procedure for the Wireless Tag Identification System

Another aspect of the invention involves optimizing a search procedure, if any, used by the wireless tag identification system to identify the presence of tags. For example, PinPoint LPS uses a tag search procedure to identify the presence of a tag, followed by further communication with the tag to receive data used to determine the identity and location of the tag. In one illustrative embodiment, a wireless tag identification system may use a first technique, e.g., a search procedure to ascertain whether it is likely that a tag is in range. Once a tag is detected, the system may switch to a second technique, e.g., a data collection mode where the interrogator determines the tag's location, ID, and other data as required. The search process may be essentially continuous whenever the interrogator's Duty Cycle is On, while data collection occurs only when a tag (or a tag-like signal) is found. The section below describes illustrative searching techniques that may avoid unnecessary use of the radio channel or other wireless communications space during the search process, and/or give users an opportunity to balance performance vs. channel usage.

Figure 3:
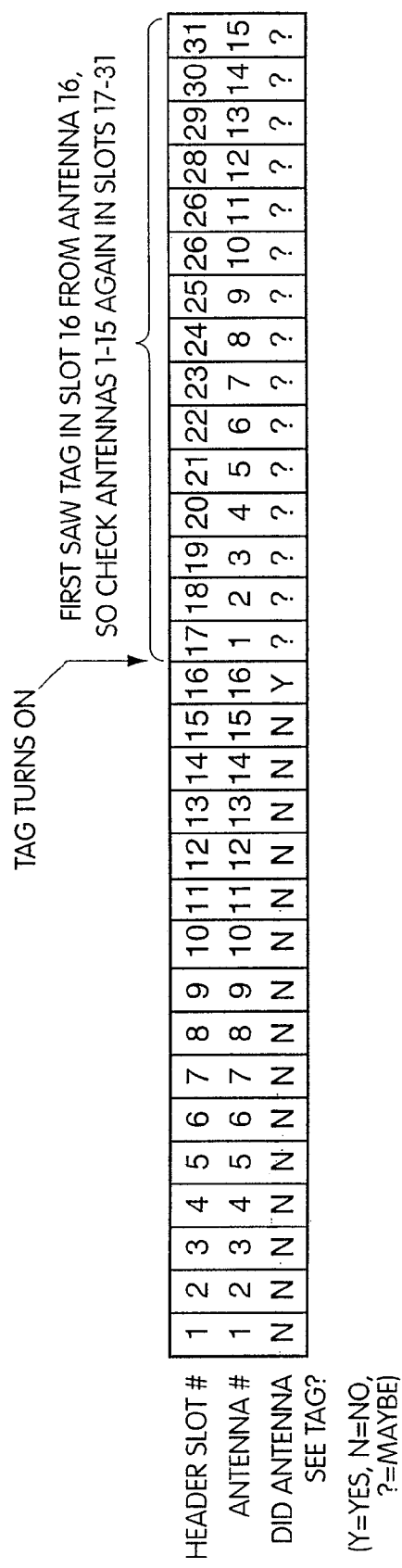
FIG. 3 is a schematic diagram of an illustrative search procedure for identifying a tag.

In the specific case of PinPoint's LPS, each interrogator is designed to support up to 16 antennas. When the system is searching for tags, it cycles quickly among those antennas, with each antenna using a slot of about 19 microseconds. If all antennas are in use, then one of the 16 antennas is always operating. When fewer antennas are actually connected to the interrogator, a slot emerges that is approximately (19*(16-N)) microseconds long (where N=number of antennas). (In an alternative operating mode, the system does not leave a slot and simply conducts the search more frequently. This somewhat improves the probability of seeing a tag, at the cost of increased use of the radio channel and possible interference with WLAN communications.) Tile PinPoint LPS tag header requires 31 19-microsecond slots to account for the possibility of 16 antennas for each interrogator. Sixteen slots are needed to search 16 antennas, and 15 more slots are needed to read the distance from the remaining 15 antennas in case the tag is first found by the $16^{th}$ antenna. For instance, the tag might turn on just before the $16^{th}$ slot, and thus the interrogator may need to check the remaining 15 slots as illustrated in FIG. 3.

In the standard configuration, PinPoint's LPS uses a high-reliability method to ascertain whether a tag is in range of an antenna. It checks each antenna for 19 microseconds, which is enough time to transmit six full 127-chip sequences. The first sequence is discarded, as it is needed for the radio system to lock onto the AGC. The next four sequences are correlated and averaged. The final sequence is ignored, as there is no pseudonoise data following to give proper correlation. This approach provides a high reliability method for determining whether any tags are in range of an antenna.

Alternative methods may achieve somewhat less reliable LPS performance, but with substantially less use of the radio channel. For example, a full search procedure that includes a plurality of sequences may be aborted if a correlated magnitude or other parameter of a signal received in a first sequence is below a threshold. In one LPS implementation, each antenna requires about one sequence—or about three microseconds—for the radio automatic gain control (in the tag and interrogator) and the carrier recovery circuit (in the interrogator) to self-calibrate. Once this is accomplished, a single sequence may be used to determine whether a tag may be in range. If the correlated magnitude of this single sequence is above a fixed threshold, which may be set relatively low, the interrogator continues to read the additional three sequences and average them. However, if the first sequence is not above the fixed threshold, the process may abort after two sequences (of about three microseconds each) and the search may move to the next antenna. If no tags are in range, the result may be a search process that takes less than seven microseconds per antenna, instead of 19 microseconds per antenna. In a system with N antennas, a slot may emerge that is approximately ((19*16)−(7*N)) microseconds long, thereby providing a window within which the WLA wireless communications may take place.

In another illustrative embodiment, the first test sequence might be four 31-chip sequences, instead of one 127-chip sequence. The subsequent three test sequences may remain as 127-chip sequences, providing most of the benefit of the four test sequences discussed above. The threshold may be tested on the first 31-chip sequence. This shortens the search process to approximately four microseconds per antenna, and a slot emerges that is approximately (19* 16)−(4*N)) microseconds in length. As an additional benefit, the use of a 31-chip test sequence provides a means of low computational complexity to determine the approximate tag location (modulo 31 chips). This information may be used to reduce the computational complexity of the 127-chip correlation process in long-range applications by eliminating large ranges of tag locations from consideration.

In this illustrative example, the analysis assumes that 16 antennas are used and thus that a new search is initiated by the interrogator every 16 slots, or about every 16*19=304 microseconds. Note that the methods described above may take variable amounts of time to complete, depending on the data encountered. Still, as long as a search is initiated and completed every 16 slots, no tags should be missed. If the distance is being read from fewer than 16 antennas, the search may in fact be initiated less frequently than every 16 slots.

While receipt of a tag signal at a single antenna may be sufficient to identify the presence of a tag, reads from multiple antennas may be needed gather sufficient data to determine tag location. Thus, in contrast to some of the embodiments described above, a subset of antennas, rather than all antennas in the wireless tag identification system, may be used to search for tags; once the tag is detected by one of those antennas in the subset, additional antennas may be used to fix the tag location. Depending on which antenna detects the tag in the search process, it may be best to use only nearby antennas for fixing tag location, thus using less of the RF channel and effectively filtering out unwanted signals from far-away antennas that may interfere with WLAN communications.

For example, a user or the wireless tag identification system under software control may decide to include a subset of antennas in tag searches, with additional antennas used to help determine location once the tag is found. The antennas involved in determining location may vary according to where the tag was found, excluding far-away antennas from consideration, resulting in reduced use of the spectrum, limiting use of the spectrum to areas where a tag is detected, increasing the time interval between searches, and reducing the probability of misinterpreting one tag's header as part of another's.

Figure 4:
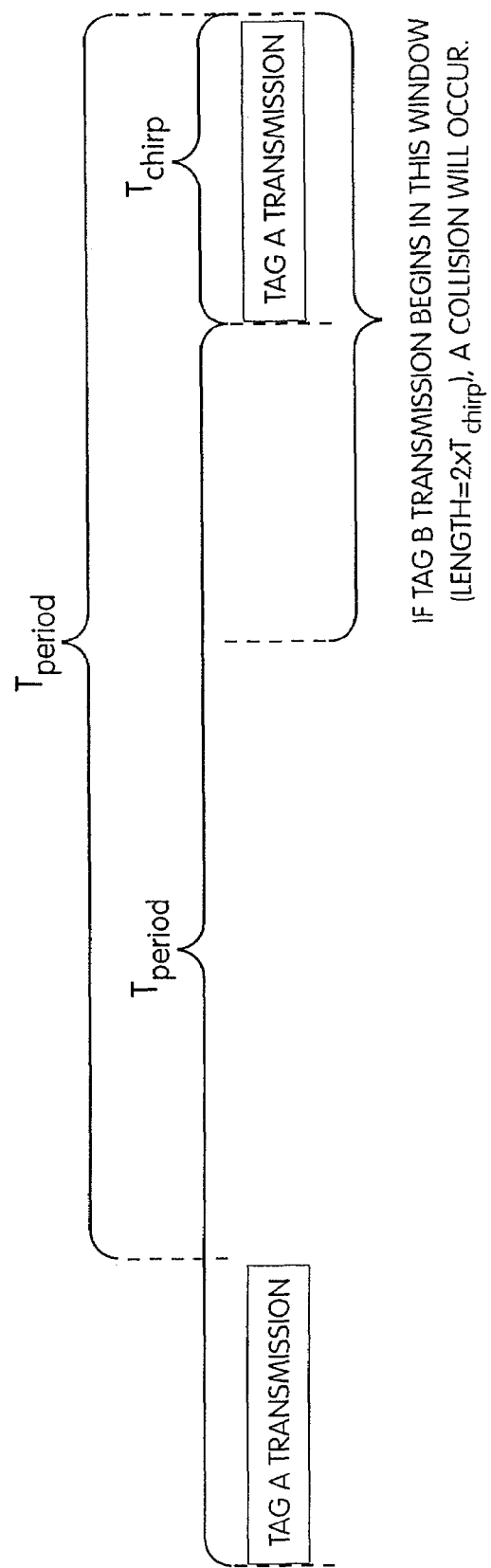
FIG. 4 illustrates how tag transmission collisions may occur and how tag datagram adjustment may affect collisions.

Another approach for creating slots between searches, e.g., within which the WLA wireless communications may take place without interference, is to extend the length of the tag datagram header. This may increase the number of collisions between tag transmisstions and decrease battery life. With regard to collisions, the probability of a particular tag being seen on a given transmission is:

$$Y = [(T_{period} - (2 \times T_{chirp}))/T_{period}]^{N-1}$$

where Y=Yield, $T_{period}$=Time between transmissions, $T_{chirp}$=Length of transmission, and N=Number of tags. Increasing the length of the header increases $T_{chirp}$, and reduces Yield accordingly. This is illustrated in FIG. 4, in which only two tags are considered. If more than two tags are transmitting, then the window for transmitting without a collision may be correspondingly smaller.

In another illustrative embodiment, tags may have different header lengths. For example, low priority tags may have a short header, while high priority tags may have a longer header. As one example, if high priority tags have 3-millisecond headers, these tags can be found reliably with a search process that is initiated every 2.7 milliseconds (assuming a 0.3 millisecond search process). In this example, lower priority tags, with headers of the minimum length, will be seen only about 10% of the time. A randomized timing component described above may be employed to avoid synchronization with other periodic processes. If low priority tags need to be read reliably at portals and the like, antennas in those areas may operate at a higher duty cycle to accommodate the shorter header length of some tags.

In another illustrative embodiment, a header for tags may be adjusted depending on whether the tag is in motion or not. For example, a tag may include a motion detector. When the tag is stationary, a short header may be used. When the motion detector indicates that a tag is now in motion, the tag may use a longer header. Thus, tags in motion a provided with a greater chance of being detected than stationary tags. For tags that are likely to be immobile for long periods of time, this technique may increase the window for WLAN transmission without interference, or minimal interference.

In another illustrative embodiment, tags with long headers may operate in a detection mode followed by a transmit mode. For example, tags with long headers may turn on in two stages. First, the tag receiver circuit may be enabled for the purpose of measuring the level of incoming 2.4 GHz energy and other maintenance functions. Once incoming energy is detected above a certain threshold, the more power-hungry output amplifiers may be enabled and the tag may begin its normal transmission process. Toward the end of the header, the transmitter may be enabled on some percentage of transmissions regardless of incoming power level, in case the threshold is set too low. The settling time assumed by the interrogator (which, as noted above, may be one full sequence or three microseconds) may need to be adjusted upward to account for time for the tag to change modes.

In another embodiment, a first set of wireless signal frequencies outside of frequencies used by at least one access point in the WLAN may be used to identify the presence of a tag. Once the presence of a tag is identified, a second set of frequencies that includes a frequency used by the WLAN may be used to communicate with the tag, e.g., to determine the identity of the tag and its location. For example, lower chipping rates with narrower output filters may be employed in the search process as compared to the tag data collection process. Direct sequence 802.11 WLAN communications are designed to use about ⅓ of the 2400-2483 GHz band, using an 11-megachip rate. This, for example, enables three 802.11 access points to co-exist in a same coverage area or to have overlapping coverage areas. An LPS search process that similarly uses about a third of the spectrum may be configured to use different parts of the spectrum than do one or two nearby 802.11 access points. Once a tag is found, the full spectrum may be used to verify the tag's operation, location, and ID. For applications that are very sensitive to cross-interference issues, the complete LPS operation may be limited to the sub-band by using a lower chipping rate and narrower filters, but sacrificing location accuracy and Signal to Noise Ratio (SNR).

For even narrower band operation, such as to minimize interference with frequency hoppers, it is possible to use a frequency hopping radio to search for tags. If energy is detected 3.36 GHz higher, a tag may be in range. In this event, the system may switch to more reliable methods for verifying the tag's operation, location, and ID. A special signal need not be transmitted by the LPS to search for the tag; instead, the tag may transpond normal WLAN traffic. If this is the case, then a tag may be detected even when the interrogator/antenna Duty Cycle is Off. Thus, Case 4 in the previous section becomes Case 3; although the interrogator Duty Cycle is Off, if a tag transponds normal WLAN traffic, energy may be detected in a band 3.36 GHz higher, suggesting that the tag is present. The interrogator may also extract the tag ID from transponded WLAN traffic, particularly if the tag is amplitude modulated. Alternatively, if there is no 2.4 GHz energy on the channel, a very short burst of energy may be emitted periodically from the interrogator to test for the probable presence of transponding tags. Once a tag is detected in range, a longer 802.11 packet or LPS packet may be sent to estimate tag location and collect the tag data.

Integration of a WLAN with Wireless Tag Identification System Operation

In previous sections, various techniques are described to minimize a wireless tag identification system's use of a wireless communication channel(s) in a manner that is independent of WLAN operation. To achieve a desired level of guaranteed WLAN performance, the LPS may be configured with substantially degraded operational parameters. For more optimal, shared utilization of the wireless channel(s), some kind of integration between the wireless tag identification system and the WLAN may be advantageous.

In general, three approaches are discussed below for integrating LPS and WLAN operation:

1. Clear channel assessment: The LPS may monitor the wireless environment and may infer information about WLAN operation. The LPS may then time its operation to periods when a WLAN is not using the radio channel(s).

2. Communication with WLAN: The LPS may be in communication with the WLAN and/or its access points, either directly or through host software, and commands may be sent between the devices to coordinate use of the wireless channel(s).

3. Combined LPS and WLAN: An LPS and a WLAN device may be integrated as a single device or two tightly integrated devices, potentially using a shared microprocessor and/or a shared radio. Operation of the two devices may be tightly integrated.

Clear Channel Assessment

In one illustrative embodiment in accordance with one aspect of the invention, the LPS may monitor the wireless environment at least in the vicinity of one interrogator or antenna, and infer information about WLAN operation. The LPS may then adjust the timing of its wireless signal generation to use the open slots in the WLAN protocol. One advantage of this technique is that it may be accomplished entirely on the LPS side, without modification of the WLAN, and may enable a wide variety of LPSs to operate harmoniously with a wide variety of off-the shelf WLAN products.

In a typical WLAN operating under the 802.11 standard, after each transmission, the 802.11 protocol defines a series of slots, each 20 microseconds in length. When two or more wireless communication devices check a slot and find it clear, they may begin transmission. If both radios are in communication with the same access point, perhaps one of these transmissions will be correctly received; it is also possible that both will be corrupted. In any case, correctly received transmissions will normally be confirmed with an acknowledgement from the access point. A unit that fails to receive an acknowledgement may retry, but must back off to later slots on a randomized basis according to rules defined in the 802.11 protocol. CCA is the nomenclature used in 802.11 for "Clear Channel Assessment." Before transmitting, 802.11 radios check the radio channel for a few microseconds to see if the channel is clear. A busy channel is taken to indicate that a higher-priority 802.11 device is using the channel, and a back-off procedure is employed. Three types of CCA checks are allowed in the Direct Sequence version of 802.11. First, the CCA may simply check for received power at 2.4 GHz. Because a higher-priority radio may be quite far away, a low threshold is set. Second, the CCA may look for a correlated signal. Third, a combination of these methods may be used.

An LPS interrogator may search for tags by emitting a wireless signal into a detection area, and searching for tag responses to this energy. For interrogators operating in the 2.4 GHz band, this search is implemented by emitting 2.4 GHz energy into the detection area. For passive (non-battery) LPSs, the 2.4 GHz field must be strong enough to power the tag over the air. For battery-operated systems, this proximity restriction is eliminated and a relatively extended area is interrogated using some form of 2.4 GHz energy. Tags may be detected when they somehow reflect or otherwise respond to this energy.

For modulated backscatter RFID systems, the interrogation signal is typically narrow band; in the 2.4 GHz band, frequency hoppers are typically employed. (Although frequency hoppers are spread spectrum devices, at any given moment they operate as narrow band emitters.) When the tag is enabled, it reflects this energy into the sidebands. The tag may be read by detecting energy in these sidebands.

In the PinPoint LPS, a wide band (40-megachip direct sequence) interrogation signal centered at 2.44 GHz is up-converted to 5.80 GHz by the tag and transmitted back to the interrogator. The tag is read by detecting and processing this 5.80 GHz response signal.

Radios operating in the 2.4 GHz band are spread spectrum devices, and as such, several such radios can operate simultaneously. Thus, under many operational conditions, an LPS may transmit data harmoniously at the same time as a WLAN. That is, in many cases those transmissions will succeed even while the other system continues to operate. Several approaches on the LPS side, outlined in previous sections of this paper, may be used to keep the channel clear a large percentage of the time. However, in cases where the two systems operate simultaneously and interfere with each other to some degree, integrated operation may be advantageous for best performance.

One way to accomplish coordination between an LPS and a WLAN is to add CCA functionality to the LPS. An LPS CCA 8, such as that shown in FIG. 2, may include special hardware that monitors the 2.4 GHz radio channel, looking for abrupt increases or decreases or other changes in wireless signal energy. Any suitable hardware, software or other components may be used in the LPS CCA 8, and may be identical, or similar, to that used in WLAN CCAs. The information from the LPS CCA 8 is sent to the LPS controller 7, one or more interrogators 6 or other portions of the wireless tag identification system as appropriate. Thus, the LPS CCA may communicate with the entire LPS through the LPS controller 7, or only to one or more interrogators 6 or antenna modules 5 as appropriate. An abrupt increase in energy may indicate that a WLAN transmission has begun, while an abrupt decrease in energy may indicate that the transmission has completed. For example, an LPS CCA 8 may detect 802.11 packets as increased energy for about a half-millisecond. After a decrease in energy, indicating WLAN packet completion, the LPS may wait for a fixed period of time, for example, one millisecond. If no power is detected during this period (other than very short spikes, which are not typical of WLAN operation), the WLAN may be taken to be "quiet," and LPS operation may begin for a period of time. The information supplied by the LPS CCA 8 may be used to control the operation of all antennas 5 and/or interrogators 6 in the LPS, or only a selected set of antennas 5 and/or interrogators 6 since the WLAN traffic detected by the LPS CCA 8 may only need affect a portion of the LPS, not the entire system.

Figure 5:
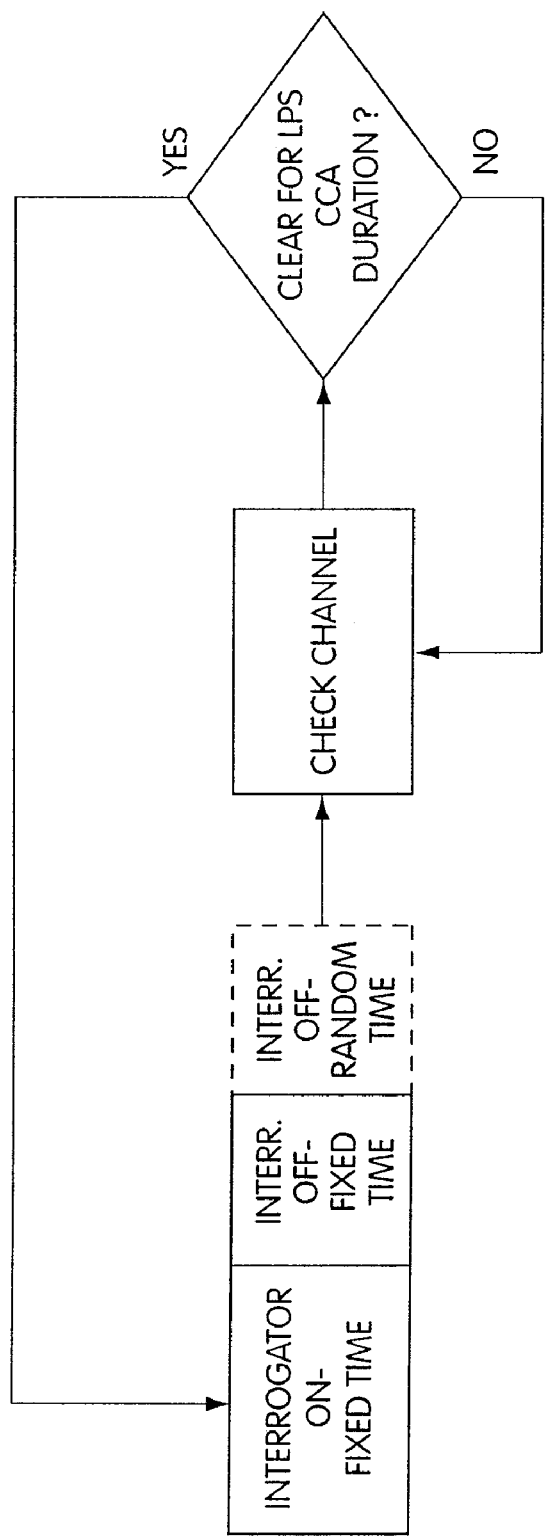
FIG. 5 is an illustrative flow diagram for duty cycle control in a wireless tag identification system.

As an example, an interrogator 6 may be on the following duty cycle: 50 milliseconds On, 25 milliseconds Off (fixed), plus 0-50 milliseconds Off (randomized). This results, on average, in a 50% duty cycle, with 50 milliseconds On and 50 milliseconds Off. At the end of the period, a CCA-enabled interrogator (an interrogator incorporating or in communication with an LPS CCA) may or may not simply turn On blindly. Instead, it may check the channel and wait until it is clear for a period of time, such as one millisecond. This period is called the LPS CCA duration. Once a clear channel is detected, the interrogator may turn On. This CCA procedure is illustrated, for example, in FIG. 5. As described above, each "slot" after an 802.11 packet is 20 microseconds in length; thus, a one-millisecond CCA duration gives 802.11 devices 50 slots in which to initiate transmission. This effectively gives the WLAN priority over the LPS. A lower CCA duration, such as one randomly varying between 50 and 100 microseconds, may tend to increasingly favor LPS operation. The LPS CCA duration may be set and/or adjusted by a user or automatically by the LPS based on WLAN operational details, cross-interference performance requirements and/or actual WLAN/LPS performance. For example, if the WLAN experiences unacceptable delays in transmission, a signal indicating the disruption may be sent to the LPS, which may respond by adjusting the CCA duration.

The time spent finding a clear channel may be incorporated into the randomized Off period for interrogators/antennas. In an example of this technique, the time spent finding a clear channel in one cycle may be subtracted from the randomized Off duration in the next cycle, resulting in the desired average duty cycle.

In one embodiment, if the LPS CCA entirely blocks LPS operation, the LPS CCA may time out and allow transmission to proceed regardless of detected WLAN traffic or signals that indicate WLA wireless communication is ongoing. This approach may be appropriate for installations where WLAN operation is characterized by relatively short bursts of activity, in which case the timeout probably indicates that some other interference mechanism is triggering the LPS CCA.

Alternatively, the LPS CCA duration may be adjusted dynamically to achieve a pre-defined level of "acceptable" interference with either the WLAN or LPS wireless operations. For example, the LPS CCA duration may be configured to start at 1000 microseconds, but with a required 50% success rate, i.e., the percentage time that the LPS is permitted to transmit wireless signals is about 50%. If this LPS CCA duration blocks LPS wireless operation more than 50% of the time (before it times out), the LPS CCA duration may be reduced until the LPS times out only 50% of the time. Note that in 802.11, an LPS CCA duration of less than 25 microseconds may interfere with high priority WLAN transmissions such as Acknowledgements, and a minimum LPS CCA duration may be set to avoid such interference.

Numerous physical implementations of an LPS CCA are possible, with various possible advantages and disadvantages. One consideration is the location of the LPS CCA. In some cases, it may be convenient for the LPS CCA to be co-located with an interrogator and/or an antenna module. This approach is the logical choice for mobile and handheld interrogators or other tag sensors. For interrogators or antennas in fixed positions, especially interrogators like PinPoint's with multiple antennas on long cables, better performance may be achieved by placing the LPS CCA in a different location, closer to a center of WLAN activity (an area that experiences more overall wireless transmission traffic). In particular, it may be best to place the LPS CCA near a WLAN access point or group of access points, on the assumption that WLAN traffic is most relevant insofar as it is seen by the access point. For interrogators that support multiple remote antennas, another option may be to incorporate an LPS CCA in each remote LPS antenna module and to change the duty cycle of each individual antenna in reaction to local variations in LPS CCA data.

Another consideration is the nature of the communication between the LPS CCA and the rest of the LPS. For example, it may or may not be practical to report CCA status every microsecond, because the microprocessor or other device in the LPS CCA and/or a physical connection (such as twisted pair at 112 kbps) may be unable to keep LIP with the load. Thus, in one embodiment, it may be desirable for the LPS CCA to include at least a rudimentary filtering and buffering. One approach is to use an 8-bit microprocessor to check the CCA status continuously and to report average levels periodically (for example, every 10 microseconds). Reports may be limited to times when the received energy moves above or below a preset threshold for a preset period of time (for example, 100 consecutive microseconds).

A third consideration is the nature of the LPS CCA detector, i.e., what is being measured and reported. Some options include:

A fixed threshold detector, where the CCA reports a one or a zero depending on whether the received energy (i.e., wireless signal energy indicative of WLA wireless communication) is above or below a fixed threshold. While this is a simple design, different LANs and different installations may require a different threshold.

A variable threshold detector that operates in essentially the same way as a fixed threshold detector, except that the threshold is set either at installation or on command from the LPS.

A CCA circuit using complete or partial chip sets used in WLAN products. For example, Intersil sells a complete 802.11 chip set on a PCMCIA card. Rudimentary software may be written to check a channel for correlated signals; more sophisticated software may track the packets being sent across the network. This approach has two important limitations:
1. For different (not 802.11) WLAN protocols, the CCA degenerates to the performance of a threshold detector.
2. When multiple WLANs are running, each in a sub-band of 2400-2483 MHz, the CCA may only track one of the sub-bands. However, custom chips with three detection circuits may be used to track three sub-bands, for example.

Despite these limitations, it may be desirable to use 802.11 chips for CCA detection, especially as the cost of these chips decrease. This may provide an opportunity for closer integration with 802.11 through software upgrades to the interrogator, LPS CCA or other portions of the wireless tag identification system. In one implementation, where the LPS CCA is in fact a full 802.11 radio, the same circuit may be used to transmit information back to the LPS or other system over the air.

The use of a CCA to coordinate the performance of a WLAN and LPS may be complicated somewhat by the possibility that multiple WLANs (up to three or four) may co-exist nearby, each using different channels. Thus, LPS performance may need to be coordinated not only with a single WLAN, but with more than one WLAN. For example, an LPS may be connected with one WLAN, and a wired connection (shown the by dashed line between the WLAN controller 40b and the LPS controller 7 in FIG. 2) may be used to coordinate the performance of the LPS and this first WLAN. However, there may be one or more additional WLANs operating nearby that are unconnected to the LPS, as also shown in FIG. 2. One way to coordinate the performance of multiple systems, such as in the case described, may be to use multiple CCAs to monitor different channels. In the embodiment illustrated in FIG. 2, the two WLANs use different channels. A CCA (not shown) may be included in the WLAN, and CCA information and other coordination information may be sent between the LPS and the WLAN over a hard wire connection to coordinate the performance of the LPS and the WLAN. The LPS CCA 8 may be used to coordinate the performance of the LPS and the second WLAN that does not have a direct communications link to the LPS. The LPS may use the CCA information both from the WLAN controller 40b and the LPS CCA 8 to control wireless operations of the LPS.

Communication Between a WLAN and a Wireless Tag Identification System

For tighter integration between a WLAN and a wireless tag identification system, software and/or firmware may be used to share one or more channels cooperatively. For example, in one illustrative embodiment, if the WLAN is being used for real-time voice and/or video communication, fast response may be needed for interactivity. Still, latencies of a fraction of a second may be tolerable in many circumstances. In such situations, the WLAN may buffer transmissions in order to leave slots for LPS operation, such as 10 milliseconds in length. Particularly in cases where content is streamed from a host to handheld devices through a wireless access point, the sharing of the channel may be orchestrated from the data source.

Channel sharing may be handled by one-way commands from the WLAN to the LPS. Thus, the WLAN may indicate to the LPS when the LPS is permitted to transmit wireless signals based on actual or expected wireless communications within the WLAN in a particular area or overall within the WLAN. The WLAN may take LPS operations into account, e.g., by permitting the LPS to transmit wireless signals at least after a certain maximum time interval. Such one-side control may, however, create problems in asset location in some cases. For example, an LPS interrogator and/or host software may forecast tag transmission times and use the forecasted times to identify tags and their location. If a particular tag has not been seen for an excessive period of time, the LPS may forecast the next transmission time of the tag and adjust the duty cycle for one or more interrogators or antennas to receive the next transmission from the missing tag. However, the LPS may be restricted from making such adjustments if another system (e.g., the WLAN) is blindly controlling its duty cycle via one-way communications.

Alternatively, two-way communication between the LPS and WLAN may be advantageous in some circumstances. In order to control cooperative sharing of a channel, the WLAN software and the LPS may exchange commands. One approach is to use a token to pass control of a channel. Another is a Master-Slave design, where one system (Master) sends commands to another (Slave). The Master may be the LPS, the WLAN system, or a third device (e.g., a host system 10 shown in FIG. 2) that sends commands to both. In a Master-Slave design, the Slave may employ a means to request use of the channel for high-priority communications. For example, if the WLAN is the Master, the LPS may request permission to transmit wireless signals at a particular time so that it may identify a missing tag. In some cases, it may be preferable to use an open software API for system coordination, so that a WLAN application may be able to adjust the LPS duty cycle to accommodate bursts of WLAN activity.

Such coordination may be accomplished through wireless communication between the LPS and the WLAN or through a wired network. One advantage of the wireless approach is the precise sharing of a time base. For example, a command might take the form, "You have control of the channel for exactly the 10 milliseconds following this packet." In a wireless system, the exact receipt time (except for radio propagation time) is known. In a wired system, various latencies may make it difficult to predict the exact receipt time, especially if the message is transmitted using Windows NT or similar operating system services. Nonetheless, it may be more practical to control the duty cycle by exchange of normal network packets through whatever means are easily available, at the cost of some latency during the data transmission period. A hardware-independent approach may enable an application program (such as the one that originates video) to orchestrate sharing of wireless communications channels in a way that does not require special hardware or firmware on the WLAN.

In another embodiment, system integration using SNMP may provide a means to adjust the LPS duty cycle. Periodic SNMP queries to wireless access points in range of an interrogator may be used to ascertain both the level of WLAN traffic and the level of networking errors. This information may be used by the LPS to adjust the duty cycle to account for minute-to-minute changes in network utilization. When WLAN use is relatively stable over time, SNMP information may be used to search for the highest level of LPS performance that does not appreciably degrade WLAN performance. SNMP may also be used to detect sudden increases in network use, providing information for the LPS to back off from channel use. For periods where the LPS is unable to sustain target levels of performance without unacceptable degradation of WLAN performance, this information may be logged with a timestamp.

Combined Wireless Tag Identification System and WLAN

In some cases, an interrogator or antenna module may be integrated with a WLAN as a single device or two tightly coupled devices, potentially using a shared microprocessor and/or a shared radio. This approach may have several advantages:

Installation Logistics:

Installing cable and hardware may result in costs and installation delay. The number of hours required for installation of a WLAN or LPS is usually not large. Nonetheless, site planning, management of the installation process, and the logistics of bringing qualified installers on-site can result in significant cost and delay, particularly if specially licensed labor is required. If the customer chooses to include multiple functions in such installations, only a single installation is required (at least in some areas) rather than multiple separate installations, thus decreasing the time, cost, and planning required.

Shared Network Connection:

Both a WLAN and a high-capacity LPS can generate substantial LAN traffic. For this reason, they are sometimes placed on their own subnets. In any case, the systems need physical LAN connections. In some installations, the LAN upgrade is a substantial part of the installation undertaking and cost. Again, this factor can be minimized by a shared installation.

A special case of the shared network concept involves the interrogator or antenna module acting as a device on the WLAN, communicating wirelessly to the LPS controller 7 or other host system through an access point. Thus, cabling may be run to fixed WLAN access points, and the interrogators or antenna modules may communicate data to the host through those access points. This may be particularly helpful in outdoor installations or for mobile interrogators. The access point may be installed in a convenient fixed position, providing network connectivity to any WLAN radio in range. This allows interrogators in range to be used wherever they are needed, communicating with the LPS controller through a WLAN connection. As noted previously, the WLAN hardware in the interrogator may double as an LPS CCA.

Certain types of WLANs, such as medical telemetry systems, feed data to a host through a proprietary wired network. A PinPoint LPS interrogator includes a processor running the Linux operating system and may double as a WLAN access point for the telemetry system.

Shared Hardware and Software:

From a cost standpoint, the more hardware that can be shared by the WLAN and the LPS, the better.

Many LPS installations feed data from interrogators into a host computer, such as the LPS controller 7. Some WLAN applications also transmit all or most data through a host computer, such as the WLAN controller 40. Medical telemetry systems are a good example of this. If such a host computer can be shared, savings may be realized on the cost of host hardware, software, and support.

To ensure that network traffic is isolated, in some installations it may be preferable to put an LPS and a WLAN on a subnet. This subnet may be shared between these two functions.

Even if different radios are employed for WLAN and LPS wireless communications, there may be advantages to including LPS and WLAN capabilities in the same device, as in the aforementioned example of a handheld interrogator. For a long-range interrogator such as an LPS interrogator, there may be significant advantages to including both functions in one package. For example, in the home or office, there is much appeal for a single device that can both provide wireless access and keep track of assets in range. Plastics, power supply, network connection, back plane, circuit boards, microprocessor, packaging, and marketing may be shared even if the radios are different. The radios themselves may be configured as plug-in components, so the user can select which technologies to use in a given situation, providing flexibility and an upgrade path.

Once the two radios are tightly integrated, potentially under the control of a single microprocessor, there is an opportunity to share the radio channel more efficiently. The same techniques described previously may be employed, but with negligible latency time to switch between tag sensor and WLAN modes. If the WLAN and the LPS operate at different frequencies, they may be integrated and may operate simultaneously. For example, Medical Telemetry systems (VHF and UHF television bands) and cordless phones such as DECT (1.9 GHz) usually operate at frequencies that are different from LPSs. If the unit is designed with reasonable care, the two systems should not affect each other's operation.

Figure 6:
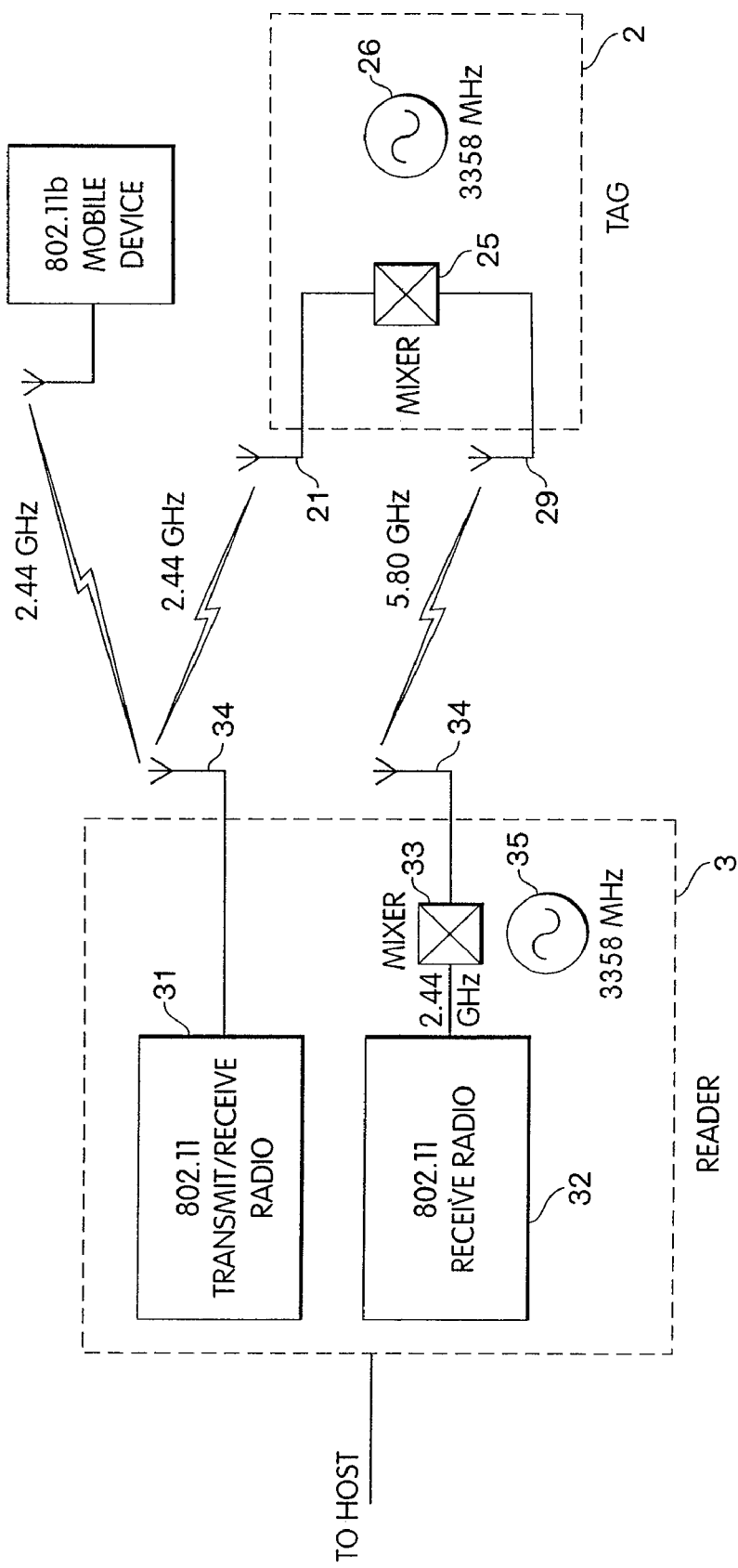
FIG. 6 is a schematic block diagram of a tag sensor that may function as an access point for a WLAN in an illustrative embodiment.

As shown in FIG. 6, a tag sensor 3 may be designed using 802.11 components. (The tag sensor 3 is given the same reference numeral as an access point since the tag sensor in this embodiment may also operate as an access point. In fact, the tag sensor may be installed as part of the WLAN and function as an access point.) A standard 802.11 radio module 31 in the interrogator may be used to transmit a Direct Sequence Spread Spectrum signal in the 2400-2483 GHz band. The tag 2 may up-convert this signal to the 5725-5875 MHz band by mixing the incoming signal from a receive antenna 21 at a mixer 25 with a 3358 MHz tone from an oscillator 26. The choice of 3358 MHz is optimized for up-conversion from the center of one band at 2442 MHz to the center of the other band at 5800 MHz. 802.11 signals are not necessarily centered at 2442 MHz; nonetheless, the tag filtering is such that only a few dB are lost toward the edges of the 2400-2483 MHz band. A signal in the 5725-5875 MHz band may be returned to the tag sensor 3 and received by a 5800 MHz antenna 34. In the tag sensor 3, the 5800 MHz signal from the tag 2 may be mixed with another 3358 MHz tone in a mixer 33, resulting in the recovery of the center frequency originally transmitted by the interrogator. Note that circuitry from the tag may be reused to implement the 3358 MHz oscillator 35 and the mixer 33. The result of this mixing is a signal that is identical to that originally transmitted, which may be fed into a second Receive 802.11-based radio 32. It is best, but not necessary, for the 802.11 transmit and receive radios to share a frequency source, thus eliminating a potential source of carrier frequency variation. Likewise, it is desirable for the 3358 MHz oscillator 35 in the receiver to use a higher quality frequency source than would be found in an inexpensive tag. Thus, the main source of carrier frequency variation would then be in the tag itself.

Figure 7:
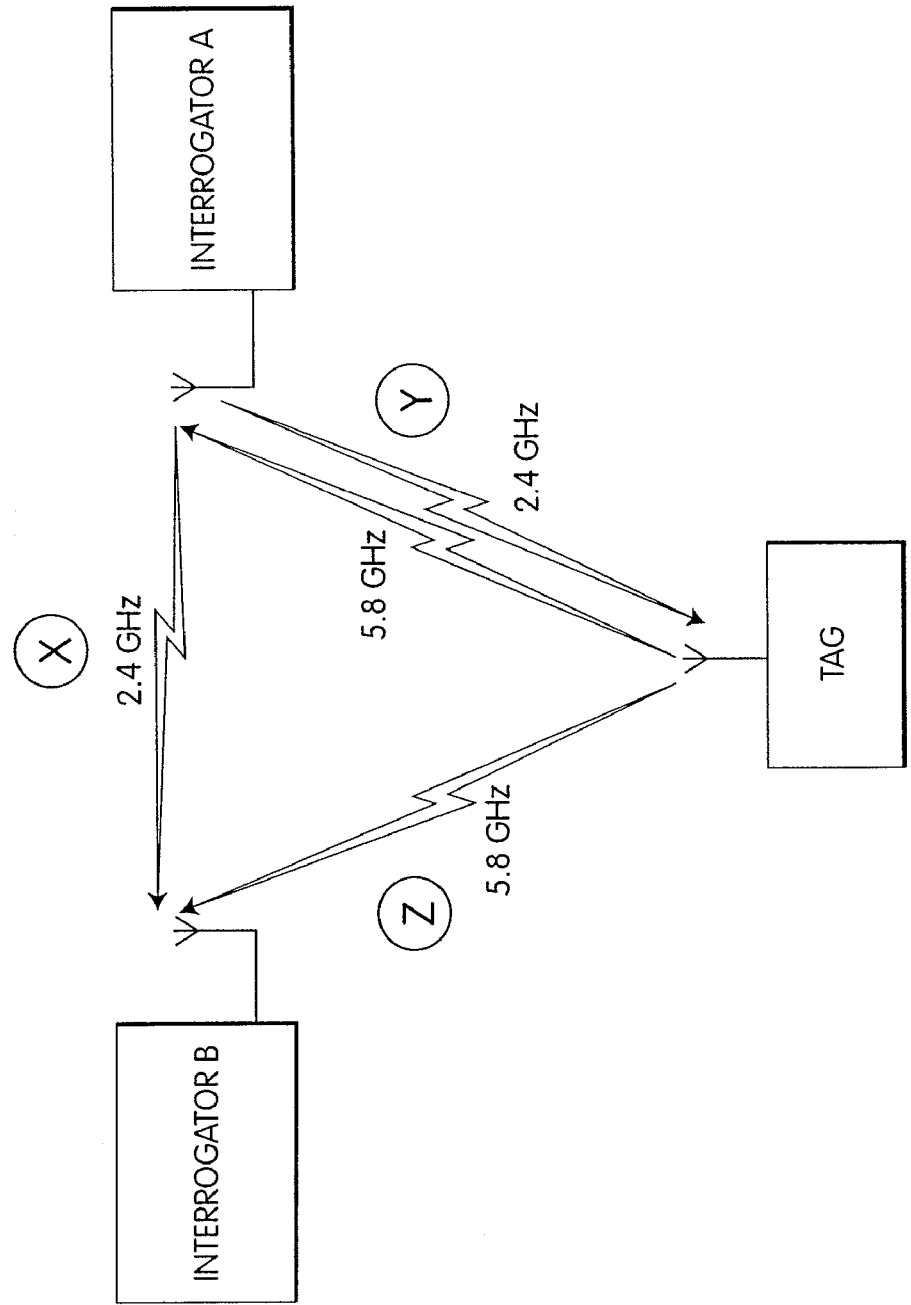
FIG. 7 illustrates how a signal from one interrogator may be received at another interrogator as well as be transponded by a tag.

The tag sensor's 3 transmit/receive radio may use exactly the hardware of a full 802.11 transmit/receive radio. This radio may operate in four modes. First, it may operate as the transmit portion of the tag sensor 3. Second, it may operate as an 802.11 1 transmit/receive radio, i.e., as a radio for an access point 3. Third, it may transmit data to another 802.11 radio, while at the same time the signal is transponded by a tag. Finally, it may receive data from another 802.11 radio at 2.4 GHz, while at a slightly delayed time a transponded version of the same signal same signal is received from a tag at 5.8 GHz, as shown in FIG. 7.

Not shown in FIG. 6 is the tag modulator. Periodically, such as every two microseconds, on an asynchronous basis, the tag 2 may invert the phase to signal a zero bit (or by opposite convention, a phase inversion may signal a one bit). If the phase happens to be inverted in the middle of an 802.11 sequence, the result may be little or no correlation in the signal received by the LPS reader. If the phase is inverted near the transition from one sequence to the next, both sequences may be correlated, but a processor decoding this data will be faced with a phase inversion imposed on top of the 802.11 protocol. The 802.11 protocol supports three types of signaling, BPSK, QPSK, and CCK, all using an 11-MB chip rate. In each case, an asynchronous phase inversion will cause one of two conditions, either a 180° change of phase between two sequences, or a lack of correlation followed by a 180° change of phase. In both cases, the phase change may be detected by noting a discrepancy between the transmitted data vs. the received data. The same principles apply for the data signaling to be used by future versions of 802.11 in the 5 GHz band, although with a different frequency plan for the tag and receiver used for operation.

A system that closely integrates an 802.11b wireless LAN with the functionality of a wireless tag identification system should be able both to locate high volumes of tags and provide high-speed communication. The tightest integration between both systems may be provided when the data structures of the WLAN communication system may also be used for location purposes. Such a system is described below.

The essence of an integrated system may lie in providing hardware and protocols that allow the asset location element of the system to use the WLAN traffic to obtain data on the location of tags. To do this, the basic system elements in both the WLAN data and the LPS location frames should be commensurate; that is, they may both occupy the same amount of time. Furthermore, the data structure for the LPS element may be short enough that the shortest possible WLAN packets are able to provide useful information when they illuminate the tag. Additionally, the hardware may be structured so that normal WLAN transmissions may be used in the LPS elements for location. The following description, in conjunction with the figures provided, illustrates a system that may provide not only coarse location data from standard 802.11b data frames, but may also provide finer resolution by using enhanced data frames.

Figure 8:
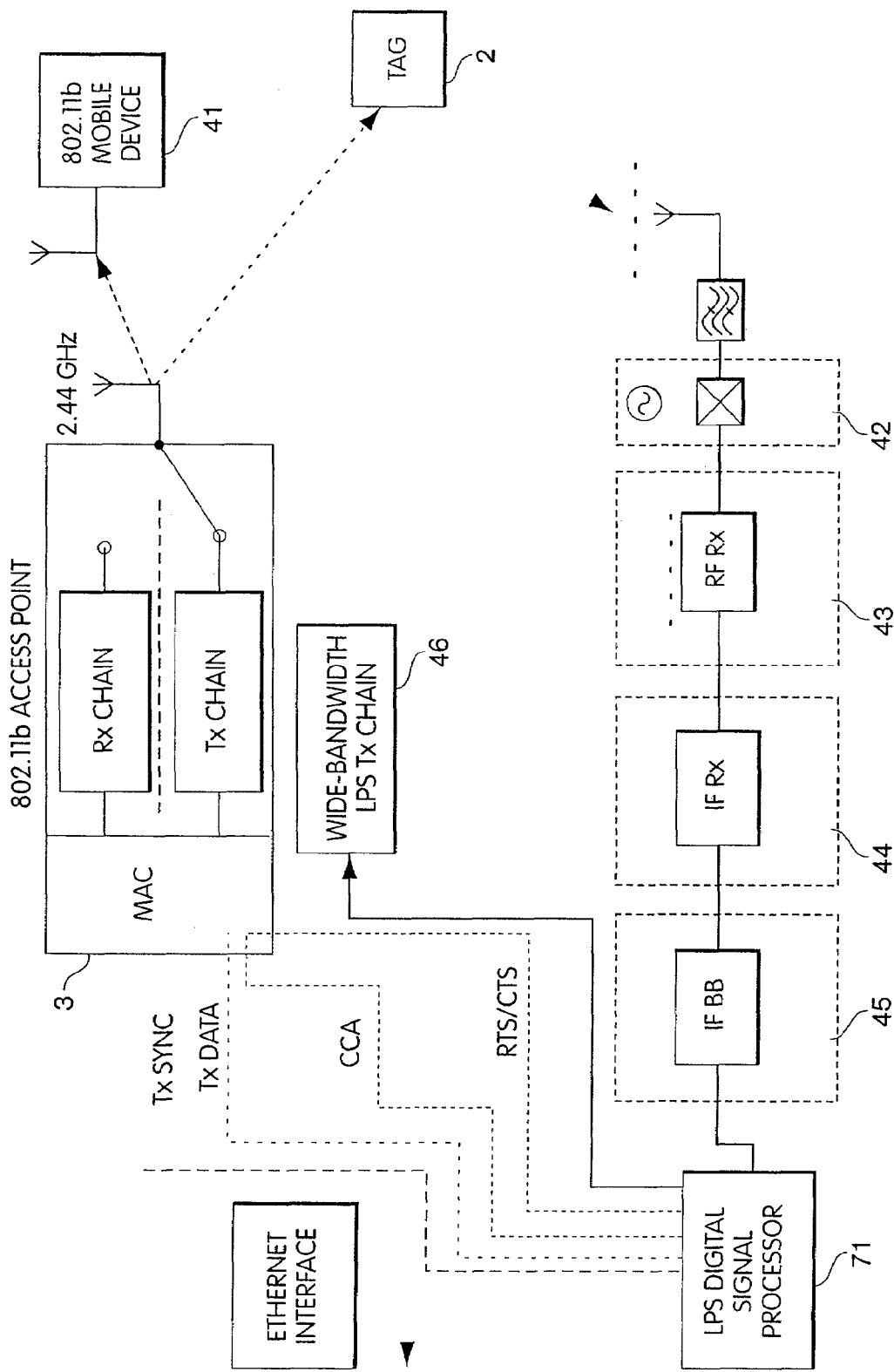
FIG. 8 is a schematic block diagram of an 802.11b access point in an illustrative embodiment.

A combined WLAN/LPS may include a standard 802.11b access point. Commercially available access points have two major hardware elements: a section dealing with controlling the media, forming on-air data frames from wired LAN traffic and forming wired LAN frames from on-air wireless traffic, referred to here as the media access controller (MAC), and a section dealing with the physical modulation of data onto an RF carrier, amplification, switching to the antenna, receive amplification and demodulation. FIG. 8 shows a schematic block diagram of an 802.11b access point 3. Also shown is a standard 802.11b mobile device 41 (station) sending and receiving WLAN traffic in the normal way. The emissions from the 802.11b access point 3 may also illuminate any LPS tags 2 in the vicinity. The tags 2 may convert the incoming signals at 2.4 GHz to signals at 5.8 GHz (with added, slower modulation containing the tag's data).

The proposed system in this illustrative embodiment may incorporate an additional element in a separate receive chain: a downconverter 42 that takes the incoming signals from an LPS tag 2 at 5.8 GHz and shifts the frequency to 2.44 GHz. The incoming signals may then be processed with chipsets designed for 802.11b signals. FIG. 8 shows schematically that these signals are processed through a 2.4 GHz LNA/downconverter 42, then through an RF receiver section 43, an IF section 44, and then through an IF baseband section 45. The aforementioned functions may be accomplished with commercially available parts in some cases, provided that these parts have sufficient bandwidth to accommodate the signals being processed. Examples of commercially available parts that have the proper architecture to process DSSS 802.11b signals include Intersil HFA 3424 (LNA), HFA3624 (IF downconverter) and HFA 3726 (baseband downconverter). These three blocks may essentially duplicate the receive functions of an 802.11b access point.

The hardware may incorporate an additional transmit chain element, the wide-bandwidth LPS Tx chain element 46 consisting of a modulator and upconverter (not shown) to replicate the functions in the Tx chain in the standard access point 3, but with greater bandwidth to support higher resolution LPS location determination. Finally, the hardware may incorporate a digital signal processing element 71 specific to the LPS functionality that uses signals available in the standard 802.11b MAC. These signals include (but are not limited to) transmit sync, transmitted data, clear channel assessment and some indicator that the access point has no data to send, thus allowing the LPS elements to use the channel.

Figure 9:
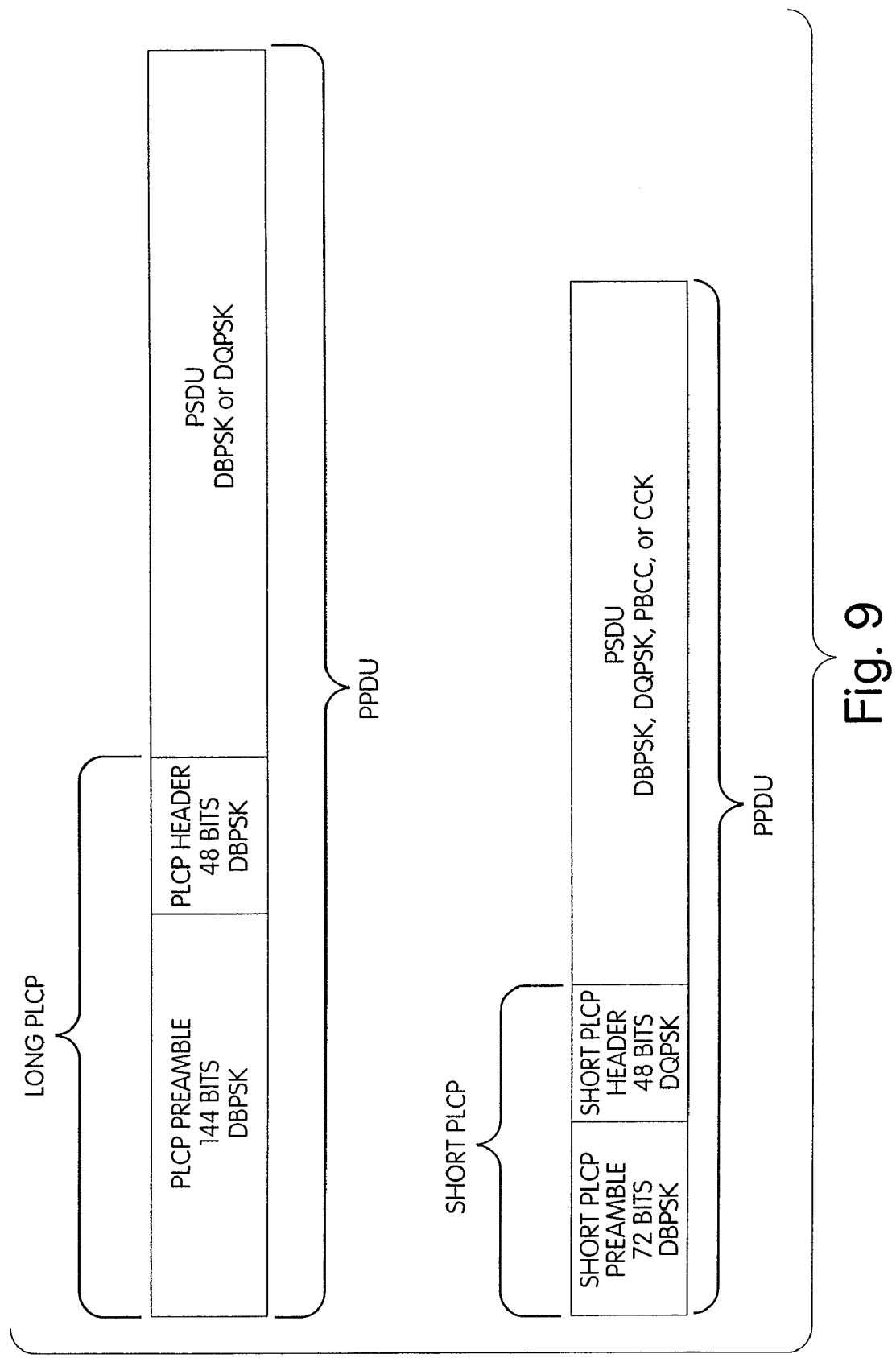
FIG. 9 illustrates two 802.11b data frames having different length header portions.

The system concept is that the LPS elements in the receive chain may use standard 802.11b signals to locate an LPS tag. These signals have a single-sided baseband bandwidth of 11 MHz and use an 11-megachip-per-second spreading signal, resulting in a base resolution for this mode of about 24 feet. A standard 802.11b system may have two modes of transmitted data frame: frames with short PHY layer convergence procedure (PLCP) and frames with long PLCP, as shown in FIG. 9. Distances to LPS tags may be measured with coarse resolution using just the short PLCP preamble in short PLCP frames. These preambles have fixed data and occupy 72 microseconds when transmitted.

In the integrated system described herein, the LPS receiver may include a demodulator and correlator supporting only DBPSK, which is a most restrictive case. However, a similar integrated system may be designed that may support higher orders of 802.11b modulation, such as DQPSK, PBCC, or CCK; if such support is included, some of the restrictions noted in this discussion may be eliminated. Note that highly integrated 802.11b chips are available that are capable of handling all forms of 802.11b modulation, although the underlying correlations may not be accessible depending on the detailed specifications of such chips.

In addition, special LPS-specific data frames may be injected into the wireless LAN traffic when two conditions coincide:

1. The access point has no data to send to remote stations, and
2. The clear channel assessment signal indicates that no other stations are transmitting.

In this case, an enhanced, but noncompliant PLCP PHY protocol data unit (PPDU) may be sent that consists of the standard PLCP preamble and a header indicating that the originator of the current frame is the access point and the destination of the current frame is also the access point. Remote stations will drop this frame, as the remote station address will not match the destination address. However, the system may modify the PSDU part of this frame from the standard 802.11b definition. The PSDU may consist of DBPSK data elements, each being 1 microsecond in length. The difference is that, instead of each symbol consisting of a data bit spread with the 11-bit Barker sequence at 11 Mcps specified in the 802.11 standard, each symbol may consist of a data bit spread with a longer sequence spread at a faster rate. One example may be where each data bit is spread with a 31-bit sequence (such as the one produced by the generator polynomial [5 2] in Dixon's notation), which has a spreading rate of 31 megachips per second. This spread signal may result in a distance resolution on the order of 8 feet, which is significantly higher than the 24 foot resolution provided by the short PLCP frames. Any combination of spreading sequence length and spreading rate that results in a symbol time duration of one microsecond will be commensurate with the long PLCP frame and may be incorporated within it.

The access point MAC may ignore this special LPS frame. One way to do this is to use the RTS/CTS line to drop the frame arriving with the access point's destination address when this line is valid. This procedure may allow the LPS digital signal processor to determine the distance to the tag, to decode the remainder of the datagram, to format the distance and tag ID properly, and to return it either to the MAC or to an Ethernet data generator. The Ethernet data generator may simply act as a mini-hub to inject the Ethernet frame into the wired LAN connection. The LPS digital signal processor may also need to provide the MAC with the proper LENGTH and DataRate parameters in the TXVECTOR associated with the PHY-TXSTART.request primitive so that the standard MAC may respond appropriately to the incoming LPS frame.

The functionality of the LPS digital signal processor, the MAC, and the Ethernet interface may be very similar to the functionality of current commercially available standard 802.11b MAC devices. The functionality of all of these elements may be combined into a single device that may be integrated into a single silicon chip to reduce cost. This may also simplify the interface to external circuits.

Figure 10:
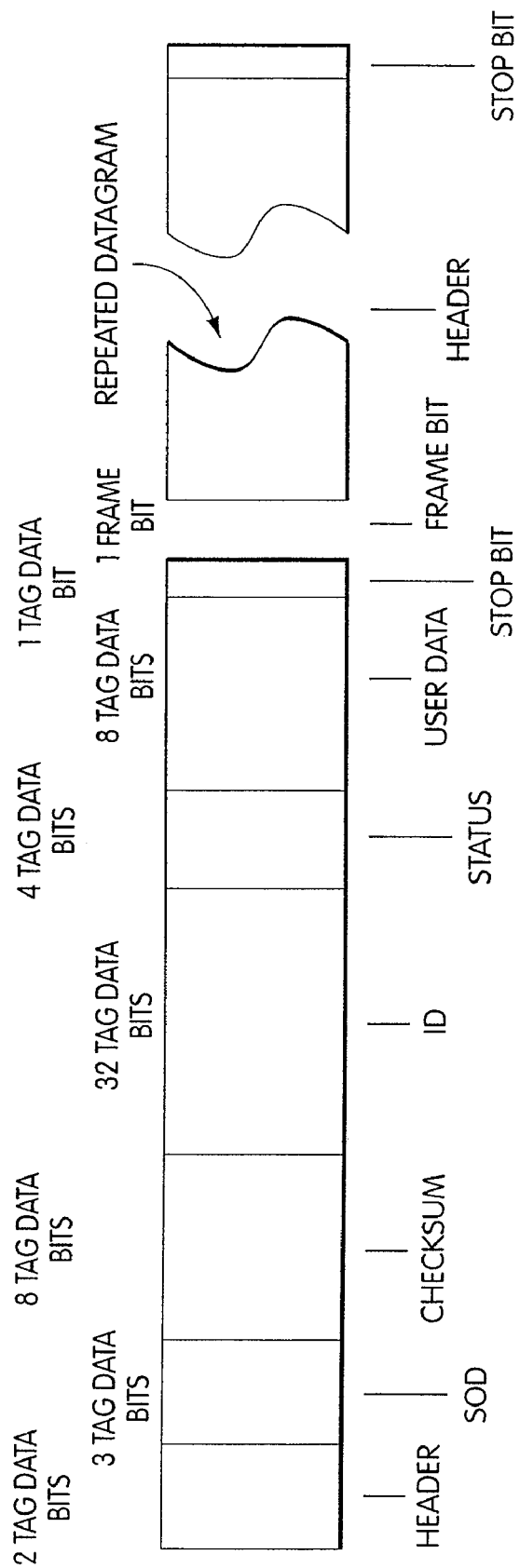
FIG. 10 illustrates an illustrative tag datagram.

The structure of the tag signal returning to the LPS elements of this system may next be considered. The tag preferably supports distance measurement, identification, and an indication that the tag datagram has arrived intact (i.e., was not corrupted by tag or 802.11b station collisions). Additionally, the tag may need to support the transmission of low-bandwidth data from equipment attached to the tag. FIG. 10 shows a possible tag datagram structure that may accommodate these needs. This datagram may consist of at least two repetitions of the basic datagram, which consists of 8 fields: the header, during which the system measures distance; the start-of-data marker field, to indicate where the data portion begins; the checksum field; the ID field; the status field; and the user data field, a stop bit field, and a framing bit.

The tag may differentially bi-phase modulate its data bits onto the signal provided by the access point. The tag transmissions may or may not be coherent in any way with the access point signals. The tag should provide data bits that are longer than the transmitted symbols, because the tag data transitions may destroy a particular symbol's correlation in the LPS demodulator. The system as illustrated uses tag data bit durations of two microseconds, or two transmitted symbols, resulting in a potential phase shift every second one-microsecond symbol. This ensures at least one intact sequence received by the LPS receiver for each bit period. Slower tag modulation would result in multiple intact sequences per tag bit.

The tag header field may consist of two tag data bits, or four transmitted symbols, that become four correlation peaks in the LPS demodulator. This may be sufficient for the LPS digital signal processor to recognize that correlations are present and to determine the distance to the tag. The start-of-data (SOD) field may consist of three tag data bits that provide a flag to indicate that the header field has ended and the data field is beginning. One implementation of the SOD field is the bit pattern "010". The checksum field may consist of eight tag data bits. One implementation of the checksum is an 8-bit CRC using the polynomial $x^8+x^4+x^3+x^2+x^0$ as its generator. This checksum may protect the ID, status, and user data fields.

The tag ID field may consist of 32 bits, sufficient for about 4.3 billion unique tags, with the LSB transmitted first. The tag status field may consist of four bits for housekeeping information. One implementation may assign one bit to the indication of low tag battery, one bit to the indication of tag tampering or other user-generated action, and one bit to indicate that the subsequent user data field contains valid data, leaving one bit reserved. The tag user data field may consist of eight bits of data provided by the user through a serial connection to the tag electronics.

The transmitted data from a tag may consist of at least two repetitions of this basic datagram. The stop bit field may be a single tag data bit whose only purpose is to allow the LPS demodulator to finish processing before the tag turns off the RF link. The framing bit may be implemented as a 2-microsecond period during which the tag transmitter is disabled, thus clearly delimiting the datagram boundaries. If the transmitted data from a tag consists of just two repetitions of the basic datagram, then the duration of the tag transmission is 117 bits or 234 microseconds. The benefit of repeating the datagram during tag transmission may be seen by examining FIG. 11, which illustrates the potential timing for the system. The tags may be completely asynchronous to the rest of the system, that is, they may transmit at times that are independent from the transmission times of the rest of the system. The tags may be provided with a checksum or CRC, since two tags may transmit at the same time, which may result in corrupted data.

Figure 11:
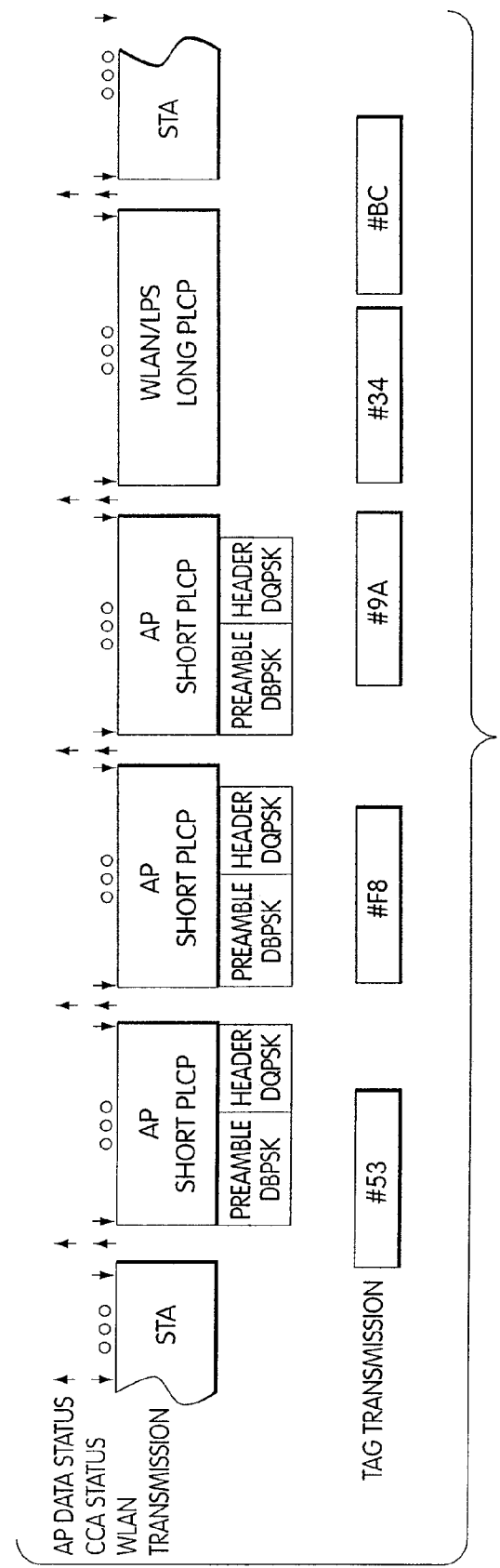
FIG. 11 shows several different tag transmission and reception timings in an illustrative embodiment.

FIG. 11 illustrates several possible scenarios for tag transmission and tag data reception. The transmission associated with tag #53 shows what may happen when the system begins to transmit to a tag that is already on. In this case, the signal received from the tag may occur as soon as the demodulator is connected to the LPS receive RF chain and bits start to stream out. The LPS demodulator may be unaware of the time at which the tag started transmission, so it may buffer the received data in a store at least two tag datagrams long and then parse the data to see if it is consistent. If the system switches on too late to receive any of the repeated basic datagrams, then the tag data may be ignored.

Note that, in FIG. 11, the access point is illuminating tag #53 with a short PLCP frame. In the most restrictive case where the LPS receiver can only decode DBPSK signals, the LPS digital signal processor may only respond to the short PLCP preamble, which has a duration of 72 microseconds. If a tag turns on exactly at the same time as the access point (as shown by tag #F8), then the tag data may be decoded only for part of the basic datagram, as 72 microseconds is only enough time to read 36 of the 58 bits in a datagram. The system may be able to measure the distance to that tag, recognize the SOD, and decode properly the CRC, but may then be able to decode properly at most 23 of the 32 ID data bits, since it may only be able to decode the data coinciding with the DBPSK portion of the preamble. Since the data in the ID field may be sent with the LSB first, the lowest 23 bits of the ID may enable software in the LPS portion of the system to match the received CRC with the last known good transmission from all tags to see whether that CRC has been received before. If that CRC has been received before and if the lowest order bits received match the ID of a tag that has been seen before, then the system may flag that particular read as a "probable good" tag read and provide that information to the databases. If there is no such match, the software may either drop the data from the databases or place the data in a "probable bad" table. In many installations with thousands of tags, most of the tags may be stationary for long periods of time. Since there may be many accurate location reads for tags sitting stationary for days or weeks at a time, the most relevant information may be that the tag is still there and has been seen by the system.

Figure 12:
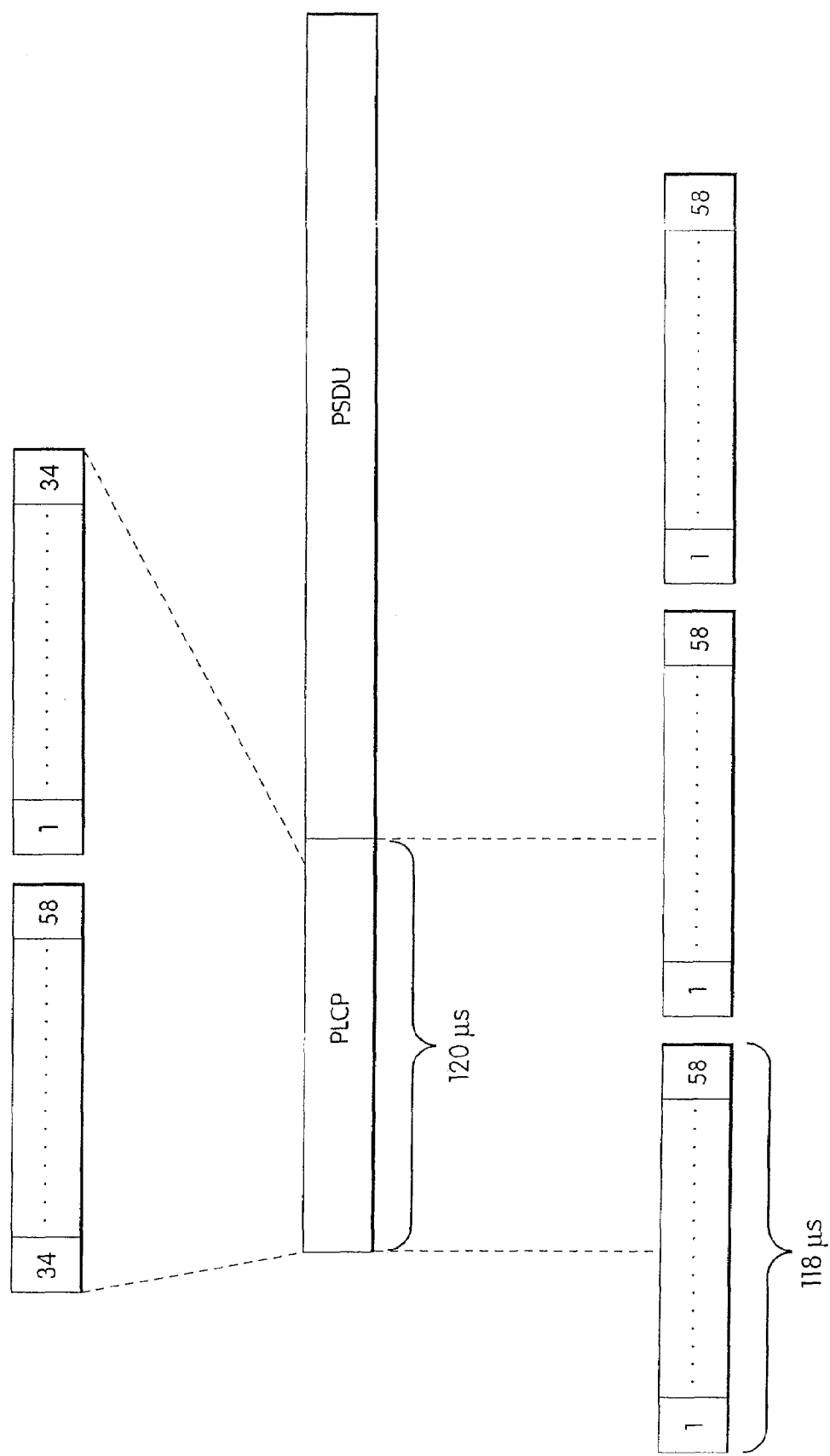
FIG. 12 illustrates how a tag transponded DQPSK signal may be decoded.

FIG. 12 shows the less restrictive case where the LPS receiver may decode tag-transponded DQPSK signals, and thus the entire short PLCP that is 120 microseconds in length. The tag datagram that is 118 microseconds in length may repeat several times; three repetitions are shown in the figure. If the PLCP is transmitted at any time during these repetitions, a complete datagram may be received in two portions as shown. It is a simple matter to concatenate these two portions together. If the LPS receiver requires a few microseconds to lock onto the PLCP message, the tag datagram may be shortened accordingly, for example, by reducing the number of User Data bits from 8 bits to 6 bits.

The tag datagram may be transmitted a number of times, with twice being the recommended minimum. The more times the datagram is repeated, the higher the probability that the tag will be detected. Approximately 8 repetitions, resulting in a half-millisecond transmission, may be a reasonable trade-off between battery life, tag collisions, and the likelihood of operating simultaneously with the asynchronous transmission of a PLCP.

In the least restrictive case, the LPS receiver may be capable of decoding tag-transponded PBCC and CCK signals, in which case the entire PPDU time period can be used for detecting tags. It should be noted that these modulation techniques provide lower SNR than DBPSK and DQPSK, which may result in a shorter tag read range when such transmissions are involved.

We now examine the system operation when a tag turns on after the access point has been transmitting (tag #9A in FIG. 11). In this case, the LPS digital signal processor may find no correlation until well into the tag datagram. Since the access point may be using a short PLCP PPDU, the tag data returned to the LPS digital signal processor may be only a partial datagram and may contain less than 23 bits of the tag ID. If no ID can be read (i.e., the tag is still on when the short PLCP preamble ends), the system may check the received CRC against its stored table of CRCs that were received properly. If there is a match, the system may flag the partial data as "possibly good." If there is no match, then the tag data may be discarded. Further processing combining both location and CRC with low-order ID bits is also possible.

Next, we examine another mode of system operation. FIG. 11 shows a graphical indication of two system flags: access point data status and CCA status. These flags may indicate, respectively, whether the access point has LAN traffic to send to remote stations, and whether the channel is clear. The fourth access point transmission in FIG. 11 illustrates that, in the gap just preceding the transmission, the CCA indicates that the channel is clear and the access point indicates that it has no data to send. If this is the case, the LPS digital signal processor and the MAC may then exchange handshake information across the RTS/CTS bus to hand control of system transmissions to the LPS digital signal processor. This change-of-command process may then initiate a long PLCP PPDU that has a specific fixed data field and that uses standard 802.11b signaling for the preamble and header, but that uses LPS-specific spreading sequences and spreading rates for the PSDU.

The PSDU length may be set by configuration data for this system and may be under control of the administrator for the system. The duration may be set to span from he minimum length packet allowed for 802.11b to the maximum length packet. This may provide a level of priority control of the LPS portion of the system with respect to he WLAN part of the system. Short PSDUs may favor WLAN traffic over tag location, while long PSDUs may favor LPS tag location over WLAN traffic. The length may vary with WLAN use.

Finally, for tag #34 in FIG. 11, the special LPS frame in 802.11b format may be able to read at least one of the basic datagram transmissions for this tag in low-resolution format (during the long PLCP header that lasts for 192 microseconds). Additionally, if the frame is long enough, other tags (such as tag #BC) may be read in high-resolution mode using the special PSDU part of the access point transmission.

Figure 13:
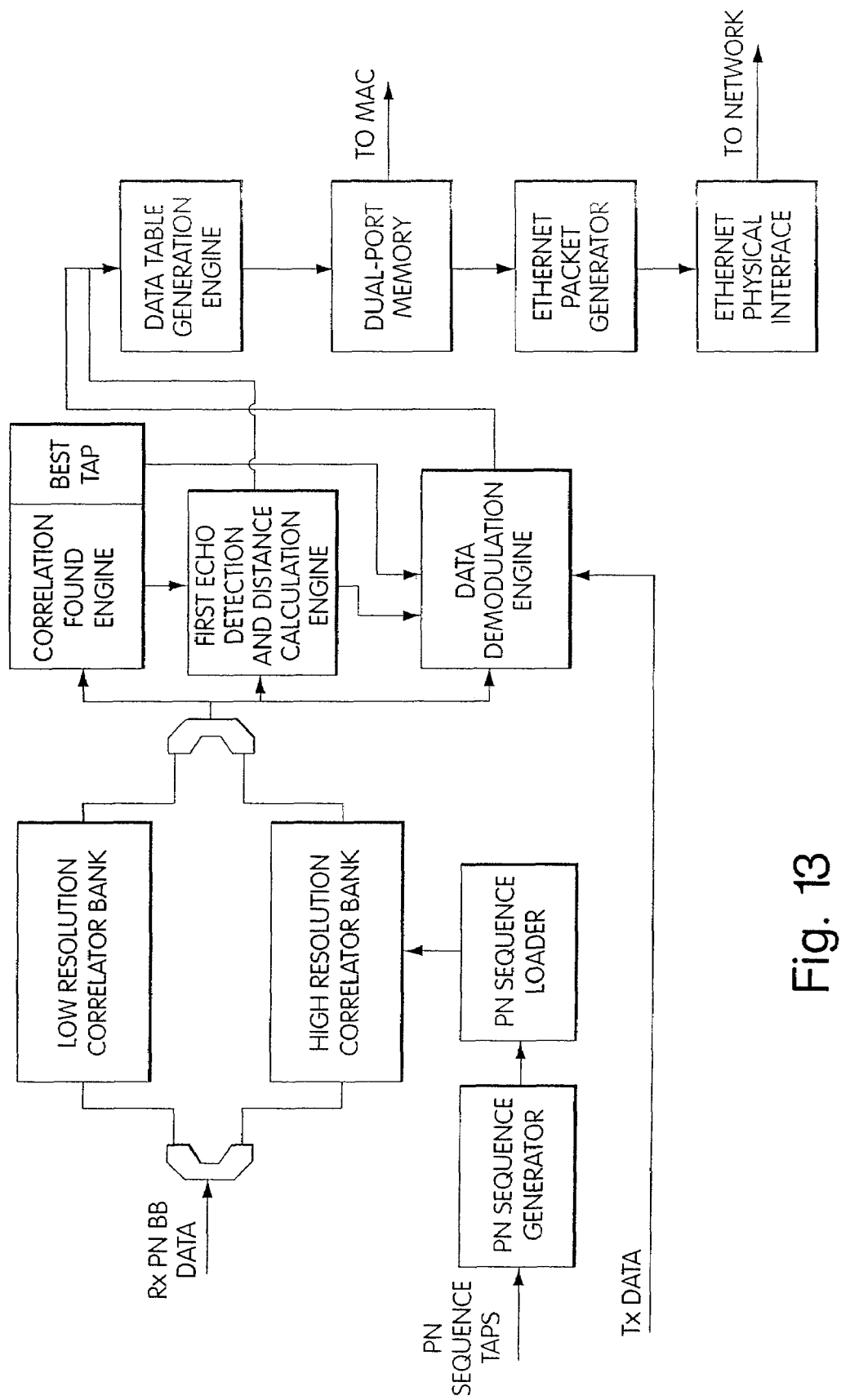
FIG. 13 is a schematic block diagram of an LPS signal processor in an illustrative embodiment.

Next, we examine the LPS baseband digital signal processor shown in FIG. 13. This may consist of two basic blocks: correlator banks and processing engines. Received baseband information may be sent to the appropriate correlator via a multiplexer depending on the current configuration of the system (low-resolution short PLCP transmissions or high-resolution long PLCP transmissions). The correlator banks may consist of multiple XOR-based correlators that may bit-match and sum the incoming data with stored reference sequences. In the case of the low-resolution correlator bank, the reference sequences may be the 11-bit Barker sequence used in 802.11b preamble transmissions. In the case of the high-resolution LPS transmissions, the reference sequences may be provided by the configuration setup to the PN sequence generator and loader. In either case, the reference sequence may be shifted one bit later for each succeeding correlator in the correlator bank, thus providing a RAKE-like correlator structure. Unlike in the RAKE correlator, however, the outputs of the individual correlators in the correlator banks may or may not be summed. Instead, the various engines may use the output data in various ways. The correlation-found engine may scan the correlator output register and determine whether a correlation signal exceeds the threshold set by the configuration. If so, it may signal the first echo detection engine to start and may pass the best tap (correlation peak location) to the data demodulation engine. The first echo detection and distance calculation engine may then determine the time location of the first received echo, perhaps using the RLS fitting procedure described in U.S. patent application Ser. No. 09/244,600, filed Feb. 4, 1999.

Once the first echo detection engine has finished, it may enable the data demodulation engine to begin parsing the output of the correlator bank's best tap, using the transmitted data as a reference. Both the data demodulation engine and the first echo detection engine may provide outputs to the data table generation engine, which may send the result (i.e., tag ID coupled with distance from the access point antenna) to a dual-port memory. One implementation of the system may have the dual-port memory sending data directly to the MAC unit that processes returned data, forming the data into wired LAN Ethernet packets. Another implementation may have the dual-port memory feeding an Ethernet packet generator that may send the final data out over an Ethernet physical interface, in parallel with the MAC Ethernet data packets.

A lower-cost embodiment of the integrated system described above may omit a high-resolution correlation bank, wide-bandwidth LPS Tx chain, and certain other features.

Figure 14:
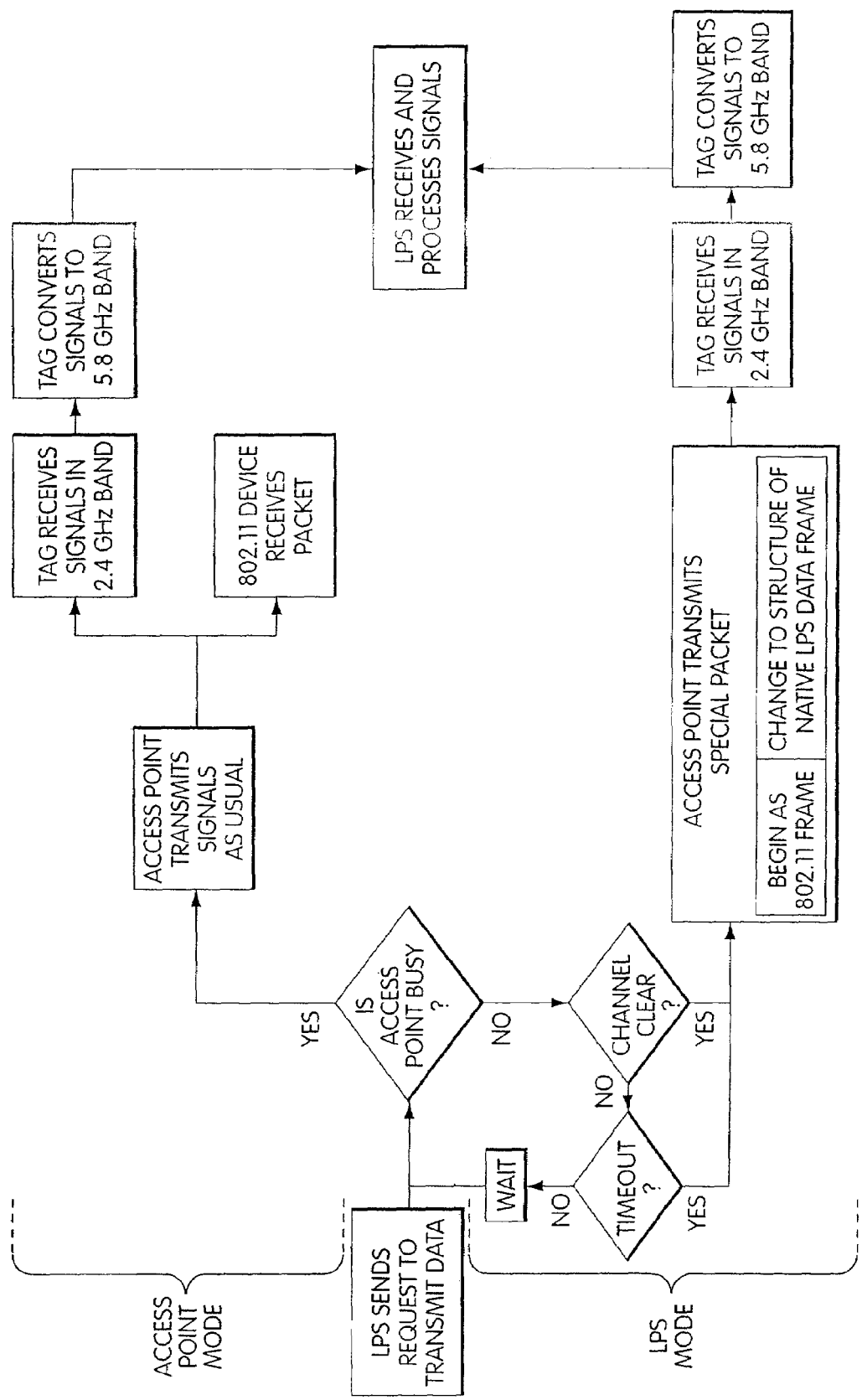
FIG. 14 is a flow diagram of operation for an integrated tag identification/wireless communication system.

The two modes of the integrated system described above (i.e., WLAN mode and is LPS mode) are illustrated in a different way in FIG. 14. In access point mode, the access point may function as a standard 802.11 transmit/receive radio. The transmit/receive radio may transmit signals in the 2.4 GHz band to a nearby 802.11 device. Simultaneously, those transmitted signals may be received by tags within range of the transmit/receive radio. A tag may convert these signals to the 5.8 GHz band and transmit the upconverted signals to the LPS receiver. The LPS receiver may then process received signals to decode the tag's datagram and determine the distance between the access point/LPS and the tag. In addition, the LPS receiver may address the WLAN with a request to transmit data. If no 802.11 packets are being transmitted by the WLAN access point's transmit/receive radio and the channel is clear, the system may switch to LPS mode. If the access point does not have data to send, but the channel is not clear, the LPS transmitter may be configured to wait. If this situation persists, a timeout condition may occur, allowing the transmission to proceed regardless of WLAN on-air status. In LPS mode, the access point's transmit/receive radio may transmit packets with the access point address. The packet sent from the transmit/receive radio in this mode can begin as a valid 802.11 frame with source and destination fields the same (using the hardware address of the access point). Since all other 802.11 terminals will ignore the packet after address filtering, the frame's structure may then change to the structure of a high-resolution LPS data frame, allowing the hybrid system to exhibit better resolution in this mode than in access point mode while preventing interference between LPS and WLAN.

Essentially, the system as described above allows the LPS to use bandwidth that is unused by the WLAN transmit/receive radio. Thus, the LPS may or may not interfere with WLAN transmission when the WLAN is using the channel, depending, for example, on timeout parameters. However, when the WLAN is not transmitting, the LPS may use the unused bandwidth for its own transmissions and provide better resolution than possible in simple access point mode. It is worth noting that the aforementioned integration may be accomplished in multiple ways. A modification may be made to a WLAN access point to include LPS capabilities, configured (for example) as an integrated module or an optional plug-in module. Similarly, an LPS interrogator may be modified to add the function of an access point's transmit/receive radio.

A tag may transpond 802.11 signals originating from a source other than the interrogator. Regardless of the original source of the 802.11 signal, the interrogator's receiver section may decode the incoming data transponded from the tag at 5.8 GHz, as shown in FIG. 8. The "transmitter" section may operate instead as a normal 802.11 receiver and may decode the incoming data arriving directly from the data source at 2.44 GHz, thus providing a reference signal for decoding tag data. If the remote source of 802.11 signal is at a known location, it may be possible to determine the distance to the tag, as shown in FIG. 7. Interrogator A and Interrogator 13 may be at fixed positions, and the distance X between them may be pre-calibrated and known. Interrogator A may emit an 802.11 packet at 2.4 GHz, which the tag may transpond to the 5.8 GHz band. This signal may be received by Interrogator A, and the distance Y between Interrogator A and the tag may be calculated based on round trip time of flight. A 2.4 GHz signal may be sent from Interrogator A to Interrogator B; this signal travels across known distance X. Interrogator B may also receive a signal from the tag at 5.8 GHz; this signal travels from Interrogator A to the tag and then to Interrogator B, and thus the signal travels across distance (Y+Z). The difference between the arrival times of the 2.4 GHz signal and the 5.8 GHz signal may be used to calculate ((Y+Z)−X). Since X and Y are known, simple substitution may be used to solve for Z. Thus, an 802.11 packet from one interrogator may be used to measure the distance from the tag to several interrogators. Although this paragraph refers to "interrogators," this is for economy of expression. Interrogator A may be simultaneously acting as a WLAN device, with emissions addressed to another 802.11 device other than Interrogator B. Similarly, Interrogator B may be a dual-purpose WLAN/LPS device.

A high-performance version of the interrogator may use a 31 MHz chip rate and digitizes at 62 MHz, giving a "ruler" of 16.1 nanoseconds or about 8 feet (round trip), with resolution of approximately ±4 feet without interpolation. Interpolation techniques may improve this resolution, as described in U.S. patent application Ser. No. 09/645,280, filed Aug. 24, 2000. An 802.11 radio uses an 11 MHz chip rate and digitizes at 22 MHz, resulting in roughly one-third the resolution. Digitizing at a faster rate may provide improved interpolation. Since multiple reads are available, the effect of a faster digitization rate may be achieved by operating the clocks of the transmit and receive digital systems at slightly different rates, resulting in some variation in the sampling offset of the received signal. Another approach available in an 802.11 radio is to change the operating frequency of the interrogator periodically to one of the eleven available center frequencies supported by 802.11, providing frequency diversity from one tag datagram to another.

Software Aspects of LPS and WLAN Integration

PinPoint has previously disclosed, for example in U.S. patent application Ser. No. 09/378,417, filed Aug. 20, 1999, a publish/subscribe software API for collecting data from interrogators and distributing this data across a network. Note that the nature of the data from both the high-performance (e.g., 31 MHz) and lower-performance (e.g., 11 MHz) LPS embodiments is essentially identical, comprising TAD (tag-antenna-distance) readings from tags, with the only difference being the reliability and accuracy of the readings. Compatibility between the two modes of operation is simply a matter of using the same TCP/IP messages between the host and interrogator; all other software is the same. For cost reasons, some features may be omitted from the lower-performance embodiment. Likewise, a combined 802.11 and LPS tag sensor may have an enhanced feature set. Such differences are reflected in the configuration service on the host computer and the corresponding messages sent between the host computer and the interrogator. Regardless of such differences, the same fundamental information, originating from the same tags, is generated in both embodiments and the same real-time messages and services may be used for both.

Integrating LPS and Other Wireless Technologies

Similar concepts to those described above may also be applied to cordless PBX products such as those operating in accordance with the DECT standard. Similar concepts may also be applied to systems operating in accordance with other wireless in-building standards, for example, those operating in the 1.9 GHz band used for cordless PBX, or to other wireless communication technologies, such as medical telemetry systems.

Similar concepts to those described above may be advantageously applied to other radios. For example, these concepts may be applied to the frequency-hopping version of 802.11 or to frequency-hopping Bluetooth radios. In these situations, some modifications may be required. For example, frequency hoppers may use FSK it may be unnecessarily complicated to demodulate a BPSK tag signal. Therefore, On-Off Keying (OOK) or another form of amplitude modulation (AM) may be used by the tag, and demodulation may occur by simply noting the presence or absence of energy in the expected sub-band around 5.8 GHz.

Integrating Other Systems with Non-Interfering Radio Frequencies

Other types of systems may also be integrated with WLANs and other in-building communication systems as described above, provided that the systems incorporated in the combined infrastructure operate at non-interfering frequencies. For example, Ultra High Frequency (UHF) beaconing RFID tag sensors may also be integrated with WLANs. UHF beaconing tags, available from various vendors including Sovereign and RFCode, periodically transmit AM or FM modulated datagrams in UHF bands such as 303.8 MHz, 418 MHz, or 433 MHz. Readers for UHF beacon tags are relatively simple in their design, and it may be advantageous to integrate such systems with 802.11 WLANs or with DECT systems, for example. As the frequencies used by these systems are typically different from those used for WLAN communication, integration may comprise co-packaging a WLAN access point and a tag sensor, with minimal sharing of radio components, but with sharing of network connections, digital devices, packaging, marketing, and so forth.

Some potential applications of a system with integrated WLAN and RFID/LPS capabilities may be found in the home environment. For example, an individual may have a WLAN installed to network his or her home computers. If the WLAN access point has integrated RFID/LPS capabilities, the individual may attach RFID tags to the artwork and other valuables within his or her home and may use the tracking capabilities of the system for a burglar alarm. A motion detector on such tags may be used to indicate tampering. Such a system may eliminate the need to install a separate infrastructure for an alarm system. Other home applications may also be developed. For example, an RFID tag with a temperature sensor may notify the system when the refrigerator is not operating correctly, or when the oven has reached a desired temperature. Numerous other uses for such integrated systems are possible both inside and outside of the home environment. These concepts may be applied not only to 802.11 WLANs and beaconing RFID systems, but they may also be applied to any similar systems that share operating frequencies or that operate using non-interfering frequencies as described above.

While the invention has been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting. Various changes may be made without departing from the invention.

The invention claimed is:

1. A method for controlling operations of a wireless communication system and a wireless tag identification system having at least partially overlapping coverage areas, comprising:

providing a wireless communication system having at least two wireless communication devices adapted to communicate by wireless signals;

providing a wireless tag identification system adapted to communicate by wireless signals with at least one tag associated with an asset; and controlling the wireless signals produced by the wireless tag identification system to minimize interference of the wireless signals with wireless communication of the wireless communication system, wherein the step of controlling the wireless signals comprises:

increasing a percentage time that the wireless tag identification system is permitted to transmit wireless signals during lower communication activity periods for the wireless communication system; and decreasing a percentage time that the wireless tag identification system is permitted to transmit wireless signals during higher communication activity periods for the wireless communication system.

2. The method of claim 1, wherein the step of controlling the wireless signals comprises:

adjusting a timing at which wireless signals are produced by the wireless tag identification system.

3. The method of claim 1, wherein the step of controlling the wireless signals comprises:
setting a duty cycle used to control when wireless signals are permitted to be produced by the wireless tag identification system to minimize interference of the wireless signals with wireless communication of the wireless communication system.

4. The method of claim 1, wherein the step of providing a wireless communication system comprises:
providing a wireless local area network (WLAN).

5. The method of claim 1, wherein the step of providing a wireless tag identification system comprises:
providing a wireless tag identification system that includes at least one tag sensor that is physically separate from fixed communication devices in the wireless communication system.

6. The method of claim 1, wherein the step of providing a wireless tag identification system comprises:
providing a wireless tag identification system that uses a fixed communication device in the wireless communication system to communicate with the tag.

7. The method of claim 1, wherein the step of providing a wireless tag identification system comprises:
providing a wireless tag identification system that uses a fixed communication device in the wireless communication system to send a wireless signal to the tag, and that includes a tag sensor that receives a wireless signal from the tag.

8. The method of claim 1, wherein the step of controlling the wireless signals comprises:
using a user selectable power to determine the power of wireless signals sent by the wireless tag identification system or a user selectable duty cycle to determine when wireless signals are sent by the wireless tag identification system to the tag.

9. The method of claim 1, wherein the step of controlling the wireless signals comprises:
synchronizing duty cycles of at least two interrogators in the wireless tag identification system.

10. The method of claim 9, wherein the step of synchronizing duty cycles comprises:
synchronizing the duty cycles of the at least two interrogators so that the interrogators are permitted to transmit wireless signals during a common time period.

11. The method of claim 9, wherein the step of controlling the wireless signals further comprises:
establishing a first tag sensor as a master tag sensor and indicating to other tag sensors when the other tag sensors are permitted to transmit wireless signals.

12. The method of claim 11, further comprising:
receiving a schedule for a plurality of On/Off cycles to the other tag sensors.

13. The method of claim 11, further comprising:
sending a signal that indicates when the other tag sensors are permitted to transmit wireless signals at a time at least equal to a transmission delay time in advance of a next period during which the other tag sensors are permitted to transmit wireless signals.

14. The method of claim 1, wherein the step of controlling the wireless signals comprises:
controlling a length of time during which wireless signals are permitted to be produced by the wireless tag identification system based on received signals from the at least one tag.

15. The method of claim 1, wherein the step of controlling the wireless signals comprises:
controlling a duty cycle for at least one tag sensor in the wireless tag identification system based on received signals from the at least one tag.

16. The method of claim 1, wherein the step of controlling the wireless signals comprises:
adjusting a time period during which a wireless tag identification system is permitted to transmit wireless signals from a previous time period length to accommodate an anticipated number of wireless signals to be received from tags.

17. The method of claim 1, wherein the step of controlling the wireless signals comprises:
adjusting a duty cycle of at least one tag sensor in the wireless tag identification system from a first duty cycle setting to a second duty cycle setting based on previously received signals from tags to provide an adjusted percentage time during which the wireless communication system is permitted to communicate using wireless signals.

18. The method of claim 1, wherein the step of controlling the wireless signals comprises:
adjusting a duty cycle or a wireless signal power for at least one tag sensor in the wireless tag identification system as a function of a time of day or a day of the week.

19. The method of claim 1, wherein the step of controlling the wireless signals comprises:
adjusting a time period during which the wireless tag identification system is permitted to transmit wireless signals based on a received tag signal history.

20. The method of claim 1, wherein the step of controlling the wireless signals comprises:
adjusting the timing at which wireless signals are produced by the wireless tag identification system to approximately coincide with a time when a tag is in an active state and enabled to send a signal, where the tag switches between an active state and a sleep state.

21. The method of claim 20, wherein the at least one tag switches between active and sleep states at a variable timing.

22. The method of claim 20, further comprising:
determining that the tag has not been identified by the wireless tag identification system for one of a time period and a number of search cycles larger than a threshold; and
the step of adjusting the timing is performed in response to determining that the tag has not been identified.

23. The method of claim 1, wherein the step of controlling the wireless signals comprises:
controlling a timing at which wireless signals are produced from a tag sensor in the wireless tag identification system based on a location of an antenna.

24. The method of claim 23, wherein the step of controlling the wireless signals comprises:
controlling the timing for the tag sensor based on a proximity of the tag sensor to at least one fixed communication device in the wireless communication system.

25. The method of claim 24, wherein the step of controlling the wireless signals comprises:
controlling the timing for the tag sensor based on a proximity of the tag sensor to at least one fixed communication device in the wireless communication system and an amount of wireless communications traffic handled by the at least one fixed communication device.

26. The method of claim 23, wherein the step of controlling the wireless signals comprises:

setting a percentage time that tag sensors nearer a high traffic area of the wireless communication system are permitted to transmit wireless signals to be lower than for tag sensors farther from a high traffic area of the wireless communication system.

27. The method of claim 1, wherein the step of controlling the wireless signals comprises:
determining if wireless signals related to the wireless communications network are likely being transmitted; and
permitting wireless signals to be produced by the wireless tag identification system approximately while wireless signals related to the wireless communication system are not being transmitted.

28. The method of claim 27, wherein the step of determining if wireless signals related to the wireless communications network are likely being transmitted comprises:
detecting a change in energy in at least one communication channel.

29. The method of claim 27, wherein the step of determining if wireless signals related to the wireless communications network are likely being transmitted comprises:
adjusting a length of a time during which an absence of wireless signal energy is detected.

30. The method of claim 29, wherein the step of determining if wireless signals related to the wireless communications network are likely being transmitted comprises:
randomly adjusting the length of time during which the absence of wireless signal energy is detected.

31. The method of claim 1, wherein the step of controlling the wireless signals comprises:
determining if energy in a communication channel that is indicative of wireless signals related to the wireless communications network is absent for a period longer than a threshold; and
permitting wireless signals to be produced by the wireless tag identification system.

32. The method of claim 27, further comprising:
adjusting a process used to determine if the wireless signals are likely being transmitted so that the wireless tag identification system is not prevented from transmitting wireless signals for more than a threshold percentage of time.

33. The method of claim 27, further comprising:
adjusting a process used to determine if the wireless signals related to the wireless communications network are likely being transmitted so that the wireless tag identification system is prevented from transmitting wireless signals for a target percentage of time.

34. The method of claim 27, wherein the step of determining if wireless signals related to the wireless communications network are likely being transmitted comprises:
detecting energy, that is indicative of wireless signals related to the wireless communications network, near a tag sensor that is part of the wireless tag identification system.

35. The method of claim 27, wherein the step of determining if wireless signals related to the wireless communications network are likely being transmitted comprises:
detecting energy, that is indicative of wireless signals related to the wireless communications network, near a high traffic area of the wireless communication system.

36. The method of claim 27, wherein the step of determining if wireless signals related to the wireless communications network are likely being transmitted comprises:
determining a plurality of statuses that are each indicative of the presence of wireless signals related to the wireless communications network; and
using an average of the statuses to control the timing at which wireless signals are permitted to be produced by the wireless tag identification system.

37. The method of claim 36, wherein the step of determining a plurality of statuses comprises:
detecting energy that is indicative of wireless signals related to the wireless communications network; and
inferring the status of the wireless communications network for each energy detection occurrence.

38. The method of claim 37, wherein the step of determining the status comprises:
comparing a signal representative of the detected energy to one of a fixed threshold and a variable threshold.

39. The method of claim 27, wherein the step of determining if wireless signals related to the wireless communications network are likely being transmitted comprises:
detecting energy that is indicative of wireless signals related to the wireless communications network in a plurality of channels used by the wireless communication system.

40. The method of claim 27, wherein the step of determining if wireless signals related to the wireless communications network are likely being transmitted comprises:
detecting energy that is indicative of wireless signals related to the wireless communications network in a channel used by the wireless communication system that is not a channel used by the wireless tag identification system.

41. The method of claim 1, further comprising:
sending a signal between the wireless tag identification system and the wireless communication system that indicates a control of the timing at which wireless signals are permitted to be produced by the wireless tag identification system.

42. The method of claim 41, wherein the step of sending a signal comprises:
sending a signal from the wireless communication system to the wireless tag identification system that indicates when the wireless tag identification system is permitted to transmit wireless signals.

43. The method of claim 42, further comprising:
using the signal to control a duty cycle for at least one tag sensor of the wireless tag identification system.

44. The method of claim 41, wherein the step of sending a signal comprises:
sending a token between the wireless tag identification system and the wireless communication system, where a system holding the token controls use of at least one wireless communication channel.

45. The method of claim 41, further comprising:
providing a host system adapted to communicate with the wireless tag identification system and the wireless communication system; and
the step of sending a signal comprises sending a signal from the host system to at least one of the wireless tag identification system and the wireless communication system representative of whether the wireless tag identification system or the wireless communication system may use a wireless communication channel.

46. The method of claim 41, wherein the step of sending a signal comprises:
sending the signal via a physical medium.

47. The method of claim 41, wherein one of the wireless tag identification system and the wireless communication system is a master system, and the other of the wireless tag identification system and the wireless communication system is a slave system, and wherein the master system controls which system may use one or more communication channels.

48. The method of claim 47, wherein the wireless communication system is the master system and controls when the wireless tag identification system is permitted to use at least one communications channel.

49. The method of claim 40, wherein the step of sending a signal comprises:
sending signals both from the wireless tag identification system to the wireless communication system and from the wireless communication system to the wireless tag identification system to control the timing at which wireless signals are permitted to be produced by the wireless tag identification system.

50. A method for identifying tags comprising:
providing at least one tag adapted to transmit a wireless signal;
providing a wireless tag identification system adapted to receive a wireless signal from the at least one tag and identify the tag;
using a first technique to determine the likelihood that the tag is within acceptable communication range, the first technique including using a subset of tag sensors in the wireless tag identification system to identify the presence of a tag; and
using a second technique to collect data from the tag if the tag is determined likely to be within an acceptable communication range, the second technique including using at least one tag sensor not in the subset to collect data from the tag.

51. The method of claim 50, wherein the step of using a first technique comprises:
adjusting a tag search procedure based on at least one signal received from tags.

52. The method of claim 50, wherein the step of using a first technique comprises:
measuring whether an energy of a received signal is not greater than a threshold.

53. A method for identifying tags comprising:
providing at least one tag adapted to transmit a wireless signal;
providing a wireless tag identification system adapted to receive a wireless signal from the at least one tag and identify the tag;
using a first technique to determine the likelihood that the tag is within acceptable communication range, the first technique including aborting a full tag search procedure that includes a plurality of sequences if a correlated magnitude of a signal received in a first sequence is below a threshold; and
using a second technique to collect data from the tag if the tag is determined likely to be within an acceptable communication range.

54. The method of claim 53, wherein each sequence is a 127-chip sequence.

55. The method of claim 53, wherein the first sequence includes 31-chip sequences, and other sequences are 127-chip sequences.

56. The method of claim 53, wherein the first sequence includes a plurality of first chip sequences and the other sequences in the search procedure include a second chip sequence, where the first chip sequence is shorter than the second chip sequence.

57. The method of claim 50, wherein the step of using a first technique comprises:
using a first set of wireless signal frequency bands to identify the presence of a tag; and
the step of using a second technique comprises:
using a second set of wireless signal frequency bands to collect data from the tag.

58. The method of claim 50, wherein the step of using a first technique comprises:
using a frequency hopper radio to identify the presence of a tag.

59. A method for identifying tags comprising:
providing at least one tag adapted to transmit a wireless signal;
providing a wireless tag identification system adapted to receive a wireless signal from the at least one tag and identify the tag;
using a first technique to determine the likelihood that the tag is within acceptable communication range, the first technique including using one type of signal used to search for tags; and
using a second technique to collect data from the tag if the tag is determined likely to be within an acceptable communication range, the second technique including using another type of signal to collect data from the tag.

60. The method of claim 59, wherein the step of using the second technique comprises:
estimating a location of the tag in relation to one or more tag sensors.

61. The method of claim 59, wherein the step of using the second technique comprises:
reading bits of data from the tag.

62. The method of claim 59, wherein the step of using one type of signal comprises:
using a signal in a narrow band; and
the step of using another type of signal comprises:
using a signal in a band that is wider than the narrow band.

63. The method of claim 59, wherein the step of using one type of signal comprises:
using a frequency hopping signal; and
the step of using another type of signal comprises:
using a direct sequence spread spectrum signal.

64. The method of claim 59, wherein the step of using one type of signal comprises:
using a direct sequence spread spectrum signal at a first chip rate; and
the step of using another type of signal comprises:
using a direct sequence spread spectrum signal at a second chip rate higher than the first chip rate.

65. The method of claim 59, wherein the step of using one type of signal comprises:
using a signal including a communications network packet; and
the step of using another type of signal comprises:
using a signal including a special purpose packet different from the network packet.

66. The method of claim 59, wherein the step of using one type of signal comprises:
using a sequence spread spectrum signal having a first length; and
the step of using another type of signal comprises:
using a sequence spread spectrum signal having a second length longer than the first length.

67. The method of claim 66, wherein the first length is one of 11, 15 and 31 chips and the second length is one of 31, 63 and 127 chips.

68. The method of claim 59, wherein the step of using one type of signal comprises:
using a single signal; and
the step of using another type of signal comprises:
using multiple signals.

69. The method of claim 59, wherein the step of using one type of signal comprises:
using a subset of tag sensors in the wireless tag identification system with the one type of signal to identify the presence of a tag; and
the step of using a second technique comprises:
selecting tag sensors to collect data from the tag depending on the tag that is identified.

70. The method of claim 59, wherein the step of using a first technique comprises:
determining if a signal received from a tag is above a threshold; and
the step of using second technique is performed if the signal is above the threshold.

71. The method of claim 59, wherein the step of using a first technique comprises:
using a signal having a first power level; and
the step of using the second technique comprises:
using a signal having a second power level different from the first power level.

72. A wireless tag identification system, comprising:
a plurality of tags each associated with an asset;
at least one tag sensor adapted to communicate by wireless signals with at least one tag, the at least one tag sensor having a coverage area within which the tag sensor can communicate with tags; and
means for controlling wireless signals produced by the at least one tag sensor to minimize interference of the wireless signals with wireless communication of a wireless communication system taking place within the coverage area of the at least one tag sensors,
wherein the means for controlling adjusts a duty cycle of at least one tag sensor in the wireless tag identification system from a first duty cycle setting to a second duty cycle setting based on previously received signals from tags to provide an adjusted percentage time during which the wireless communication system is permitted to communicate using wireless signals.

73. The system of claim 72, wherein the means for controlling the wireless signals adjusts a timing at which wireless signals are produced by the wireless tag identification system.

74. The system of claim 72, wherein the means for controlling the wireless signals adjusts a power level of the wireless signals.

75. The system of claim 72, wherein the means for controlling the wireless signals sets a duty cycle used to control when wireless signals are permitted to be produced by the wireless tag identification system to minimize interference of the wireless signals with wireless communication of the wireless communication system.

76. The system of claim 72, wherein the wireless communication system comprises a wireless local area network (WLAN).

77. The system of claim 72, wherein the wireless tag identification system comprises at least one tag sensor that is physically separate from fixed communication devices in the wireless communication system.

78. The system of claim 72, wherein the wireless tag identification system is adapted to use a fixed communication device in the wireless communication system to communicate with the tag.

79. The system of claim 72, further comprising:
means for allowing a user to select a power of wireless signals sent by the wireless tag identification system or to select a duty cycle to determine when wireless signals are sent by the wireless tag identification system to the tag.

80. A wireless tag identification system, comprising:
a plurality of tags each associated with an asset;
at least one tag sensor adapted to communicate by wireless signals with at least one tag, the at least one tag sensor having a coverage area within which the tag sensor can communicate with tags; and
means for controlling wireless signals produced by the at least one tag sensor to minimize interference of the wireless signals with wireless communication of a wireless communication system taking place within the coverage area of the at least one tag sensor;
wherein the means for controlling the wireless signals synchronizes duty cycles of at least two tag sensors in the wireless tag identification system, and a first tag sensor is a master tag sensor and other tag sensors are notified when the other tag sensors are permitted to transmit wireless signals.

81. The system of claim 80, wherein a schedule for a plurality of On/Off cycles is sent to the other tag sensors.

82. The system of claim 80, wherein a signal that indicates when the other tag sensors are permitted to transmit wireless signals is sent at a time at least equal to a transmission delay time in advance of a next period during which the other tag sensors are permitted to transmit wireless signals.

83. The system of claim 72, wherein the means for controlling controls a length of time during which wireless signals are permitted to be produced by the wireless tag identification system based on received signals from the at least one tag.

84. The system of claim 72, wherein the means for controlling controls a duty cycle for at least one tag sensor in the wireless tag identification system based on received signals from the at least one tag.

85. The system of claim 72, wherein the means for controlling adjusts a time period during which a wireless tag identification system is permitted to transmit wireless signals from a previous time period length to accommodate an anticipated number of wireless signals to be received from tags.

86. The system of claim 72, wherein the means for controlling adjusts a duty cycle or a wireless signal power for at least one tag sensor in the wireless tag identification system as a function of a time of day or a day of the week.

87. The system of claim 72, wherein the means for controlling adjusts a time period during which the a tag sensor is permitted to transmit wireless signals based on a received tag signal history.

88. The system of claim 72, wherein the means for controlling increases a percentage time that a tag sensor is permitted to transmit wireless signals during lower communication activity periods for the wireless communication system; and
decreases a percentage time that the wireless tag identification system is permitted to transmit wireless signals during higher communication activity periods for the wireless communication system.

89. The system of claim 72, wherein the means for controlling adjusts the timing at which wireless signals are produced by a tag sensor to approximately coincide with a time when a tag is in an active state and enabled to send a signal, where the tag switches between an active state and a sleep state.

90. The system of claim 89, wherein the tag switches between active and sleep states at a variable timing.

91. The system of claim 89, wherein the means for controlling determines that the tag has not been identified by the wireless tag identification system for one of a time period and a number of search cycles larger than a threshold; and adjusts the timing in response to determining that the tag has not been identified.

92. The system of claim 72, wherein the means for controlling controls a timing at which wireless signals are produced from a tag sensor in the wireless tag identification system based on a location of an antenna associated with the tag sensor.

93. The system of claim 92, wherein the means for controlling controls the timing for the tag sensor based on a proximity of a tag sensor antenna to at least one fixed communication device in the wireless communication system.

94. The system of claim 93, wherein the means for controlling controls the timing for the tag sensor based on a proximity of a tag sensor antenna to at least one fixed communication device in the wireless communication system and an amount of wireless communications traffic handled by the at least one fixed communication device.

95. The system of claim 92, wherein the means for controlling sets a percentage time that tag sensors nearer a high traffic area of the wireless communication system are permitted to transmit wireless signals to be lower than for tag sensors farther from a high traffic area of the wireless communication system.

96. A wireless tag identification system, comprising:
a plurality of tags each associated with an asset;
at least one tag sensor adapted to communicate by wireless signals with at least one tag, the at least one tag sensor having a coverage area within which the tag sensor can communicate with tags; and
means for controlling wireless signals produced by the at least one tag sensor to minimize interference of the wireless signals with wireless communication of a wireless communication system taking place within the coverage area of the at least one tag sensor;
wherein the means for controlling determines if wireless signals related to the wireless communications network are likely being transmitted by detecting a change in energy in at least one communication channel and determines if energy in a communication channel that is indicative of wireless signals related to the wireless communications network is absent for a period longer than a threshold; and
permits wireless signals to be produced by a tag sensor approximately while wireless signals related to the wireless communication system are not being transmitted.

97. The system of claim 96, wherein the means for controlling adjusts a length of a time during which an absence of wireless signal energy is detected.

98. The system of claim 97, wherein the means for controlling randomly adjusts the length of time during which the absence of wireless signal energy is detected.

99. The system of claim 96, wherein the means for controlling adjusts a process used to determine if the wireless signals are likely being transmitted so that the wireless tag identification system is not prevented from transmitting wireless signals for more than a threshold percentage of time.

100. The system of claim 96, wherein the means for controlling adjusts a process used to determine if the wireless signals are likely being transmitted so that the wireless tag identification system is prevented from transmitting wireless signals for a target percentage of time.

101. The system of claim 96, wherein the means for controlling detects energy, that is indicative of wireless signals related to the wireless communications network, near a tag sensor that is part of the wireless tag identification system.

102. The system of claim 96, wherein the means for controlling detects energy, that is indicative of wireless signals related to the wireless communications network, near a high traffic area of the wireless communication system.

103. The system of claim 96, wherein the means for controlling determines a plurality of statuses that are each indicative of the presence of wireless signals related to the wireless communications network; and
uses an average of the statuses to control the timing at which wireless signals are permitted to be produced by the tag sensor.

104. The system of claim 103, wherein the means for controlling detects energy that is indicative of wireless signals related to the wireless communications network; and
infers the status of the wireless communications network for each energy detection occurrence.

105. The system of claim 104, wherein the means for controlling compares a signal representative of the detected energy to one of a fixed threshold and a variable threshold.

106. The system of claim 96, wherein the means for controlling detects energy that is indicative of wireless signals related to the wireless communications network in a plurality of channels used by the wireless communication system.

107. The system of claim 96, wherein the means for controlling detects energy that is indicative of wireless signals related to the wireless communications network in a channel used by the wireless communication system that is not a channel used by the wireless tag identification system.

108. The system of claim 72, further comprising:
a communication link that carries a signal between the wireless tag identification system and the wireless communication system that indicates a control of the timing at which wireless signals are permitted to be produced by the wireless tag identification system.

109. The system of claim 108, wherein the signal is sent from the wireless communication system to the wireless tag identification system that indicates when the wireless tag identification system is permitted to transmit wireless signals.

110. The system of claim 109, wherein the means for controlling uses the signal to control a duty cycle for at least one tag sensor of the wireless tag identification system.

111. The system of claim 108, wherein the signal includes a token sent between the wireless tag identification system and the wireless communication system, where a system holding the token controls use of at least one wireless communication channel.

112. The system of claim 108, further comprising:
a host system adapted to communicate with the wireless tag identification system and the wireless communication system, and adapted to send a signal to at least one of the wireless tag identification system and the wireless communication system representative of whether the wireless tag identification system or the wireless communication system may use a wireless communication channel.

113. The system of claim 108, wherein one of the wireless tag identification system and the wireless communication system is a master system, and the other of the wireless tag identification system and the wireless communication system is a slave system, and wherein the master system controls which system may use one or more communication channels.

114. The system of claim 113, wherein the wireless communication system is the master system and controls when the wireless tag identification system is permitted to use at least one communications channel.

115. The system of claim 80, wherein a clock in at least one tag sensor is operated at a different rate than at least one other tag sensor, resulting in a variation in a sampling offset of a signal received from at least one tag.

116. The system of claim 80, wherein an operating frequency of at least one tag sensor is adjusted periodically to provide frequency diversity from one signal received from a tag to another signal received from a tag.

117. A wireless tag identification system for identifying tags comprising:
at least one tag adapted to produce a wireless signal;
at least one tag sensor that receives a wireless signal from the at least one tag;
means for determining an identity of the tag based on the wireless signal received from the tag; and
means for controlling how wireless signals are generated by the tag sensor, the means for controlling using a first technique to determine the likelihood that the tag is within acceptable communication range, and using a second technique to collect data from the tag if the tag is determined likely to be within an acceptable communication range;
wherein the first technique comprises adjusting a tag search procedure based on at least one signal received from tags.

118. The system of claim 117, wherein the step of using a first technique comprises:
measuring whether an energy of a received signal is not greater than a threshold.

119. The system of claim 117, wherein the step of using a first technique comprises:
aborting a full tag search procedure that includes a plurality of sequences if a correlated magnitude of a signal received in a first sequence is below a threshold.

120. The system of claim 119, wherein each sequence is a 127-chip sequence.

121. The system of claim 119, wherein the first sequence includes 31-chip sequences, and other sequences are 127-chip sequences.

122. The system of claim 119, wherein the first sequence includes a plurality of first chip sequences and the other sequences in the search procedure include a second chip sequence, where the first chip sequence is shorter than the second chip sequence.

123. The system of claim 117, wherein the first technique comprises:
using a subset of tag sensors to identify the presence of a tag; and
the step of using a second technique comprises:
using at least one tag sensor not in the subset to collect data from the tag.

124. The system of claim 117, wherein the first technique comprises:
using a first set of wireless signal frequency bands to identify the presence of a tag; and
the step of using a second technique comprises:
using a second set of wireless signal frequency bands to collect data from the tag.

125. The system of claim 117, wherein the first technique comprises:
using a frequency hopper radio to identify the presence of a tag.

126. A wireless tag identification system for identifying tags comprising:
at least one tag adapted to produce a wireless signal;
at least one tag sensor that receives a wireless signal from the at least one tag;
means for determining an identity of the tag based on the wireless signal received from the tag; and
means for controlling how wireless signals are generated by the tag sensor, the means for controlling using a first technique to determine the likelihood that the tag is within acceptable communication range, and using a second technique to collect data from the tag if the tag is determined likely to be within an acceptable communication range;
wherein the first technique comprises:
using a first type of signal used to search for tags; and
the step of using the second technique comprises:
using a second type of signal to collect data from the tag.

127. The system of claim 126, wherein the second technique comprises:
estimating a location of the tag in relation to one or more tag sensors.

128. The system of claim 126, wherein the second technique comprises:
reading bits of data from the tag.

129. The system of claim 126, wherein the first type of signal comprises a signal in a narrow band; and
the second type of signal comprises a signal in a band that is wider than the narrow band.

130. The system of claim 126, wherein the first type of signal comprises a frequency hopping signal; and
the second type of signal comprises a direct sequence spread spectrum signal.

131. The system of claim 126, wherein the first type of signal comprises a direct sequence spread spectrum signal at a first chip rate; and
the second type of signal comprises a direct sequence spread spectrum signal at a second chip rate higher than the first chip rate.

132. The system of claim 126, wherein the first type of signal comprises a signal including a communications network packet; and
the second type of signal comprises a signal including a special purpose packet different from the network packet.

133. The system of claim 126, wherein the first type of signal comprises a sequence spread spectrum signal having a first length; and
the second type of signal comprises a sequence spread spectrum signal having a second length longer than the first length.

134. The system of claim 133, wherein the first length is one of 11, 15 and 31 chips and the second length is one of 31, 63 and 127 chips.

135. The system of claim 126, wherein the first type of signal comprises a single signal; and
the second type of signal comprises multiple signals.

136. The system of claim 126, wherein the first technique comprises:
using a subset of tag sensors in the wireless tag identification system with a first type of signal to identify the presence of a tag; and
the second technique comprises:
selecting tag sensors to collect data from the tag depending on the tag that is identified.

137. The system of claim 117, wherein the first technique comprises:
determining if a signal received from a tag is above a threshold; and
the second technique is performed if the signal is above the threshold.

138. A method for controlling operations of a wireless communication system and a wireless tag identification system having at least partially overlapping coverage areas, comprising:

providing a wireless communication system having at least two wireless communication devices adapted to communicate by wireless signals;

providing a wireless tag identification system adapted to communicate by wireless signals with at least one tag associated with an asset;

controlling the wireless signals produced by the wireless tag identification system to minimize interference of the wireless signals with wireless communication of the wireless communication system;

providing a host system adapted to communicate with the wireless tag identification system and the wireless communication system; and sending a signal between the wireless tag identification system and the wireless communication system that indicates a control of the timing at which wireless signals are permitted to be produced by the wireless tag identification system;

wherein the step of sending a signal comprises sending a signal from the host system to at least one of the wireless tag identification system and the wireless communication system representative of whether the wireless tag identification system or the wireless communication system may use a wireless communication channel.

* * * * *